(12) United States Patent
Sato et al.

(10) Patent No.: US 7,058,613 B1
(45) Date of Patent: Jun. 6, 2006

(54) DEVICE AND METHOD FOR USER IDENTIFICATION CHECK BASED ON USER-SPECIFIC FORMULA

(75) Inventors: Tsuneo Sato, Kawasaki (JP); Kiyoshi Kotegawa, Oita (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/441,081

(22) Filed: Nov. 16, 1999

(30) Foreign Application Priority Data

Apr. 21, 1999 (JP) ................................. 11-113058

(51) Int. Cl.
*H04K 1/00* (2006.01)
(52) U.S. Cl. ..................... 705/72; 705/75; 713/182
(58) Field of Classification Search ........ 713/182–185, 713/186, 702; 705/72, 75
See application file for complete search history.

(56) References Cited

U.S. PATENT DOCUMENTS

| 5,163,097 | A | * | 11/1992 | Pegg | ........................... 713/183 |
| 5,604,489 | A | * | 2/1997 | Hyatt, Jr. | ................... 340/5.55 |
| 5,754,652 | A | * | 5/1998 | Wilfong | ..................... 713/183 |

FOREIGN PATENT DOCUMENTS

JP          63-170764          7/1988

* cited by examiner

*Primary Examiner*—David Y. Jung
*Assistant Examiner*—Thomas Ho
(74) *Attorney, Agent, or Firm*—Staas & Halsey LLP

(57) ABSTRACT

A device for checking user identification includes a calculation unit which calculates a check value by applying a user-specific formula to a randomly generated number, and a matching unit which checks if the check value matches a user-entered value that is entered by a user in response to the randomly generated number presented to the user.

7 Claims, 22 Drawing Sheets

FIG. 8

| PASSWORD LOGIC REGISTRATION | |
|---|---|
| USER ID : | 0 0 0 0 0 6 |
| PASSWORD LOGIC : | (B−A)+C |

[ O K ]   [ CANCEL ]   [ END ]

FIG. 9

| ENTER PASSWORD | |
|---|---|
| USER ID : | 0 0 0 0 0 1 |
| PRESENTED NUMBER : | 4 3 6 1 |
| PASSWORD : | * * |

[ O K ]   [ CANCEL ]   [ END ]

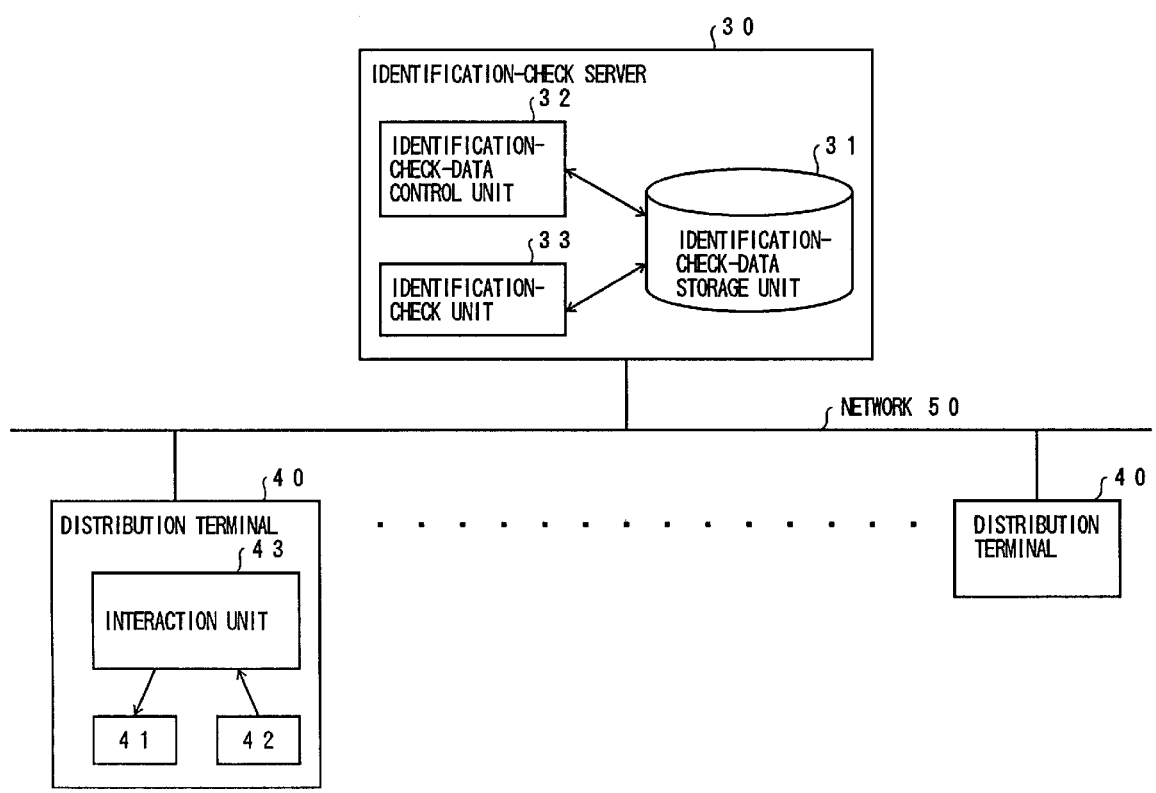
F I G. 1 0

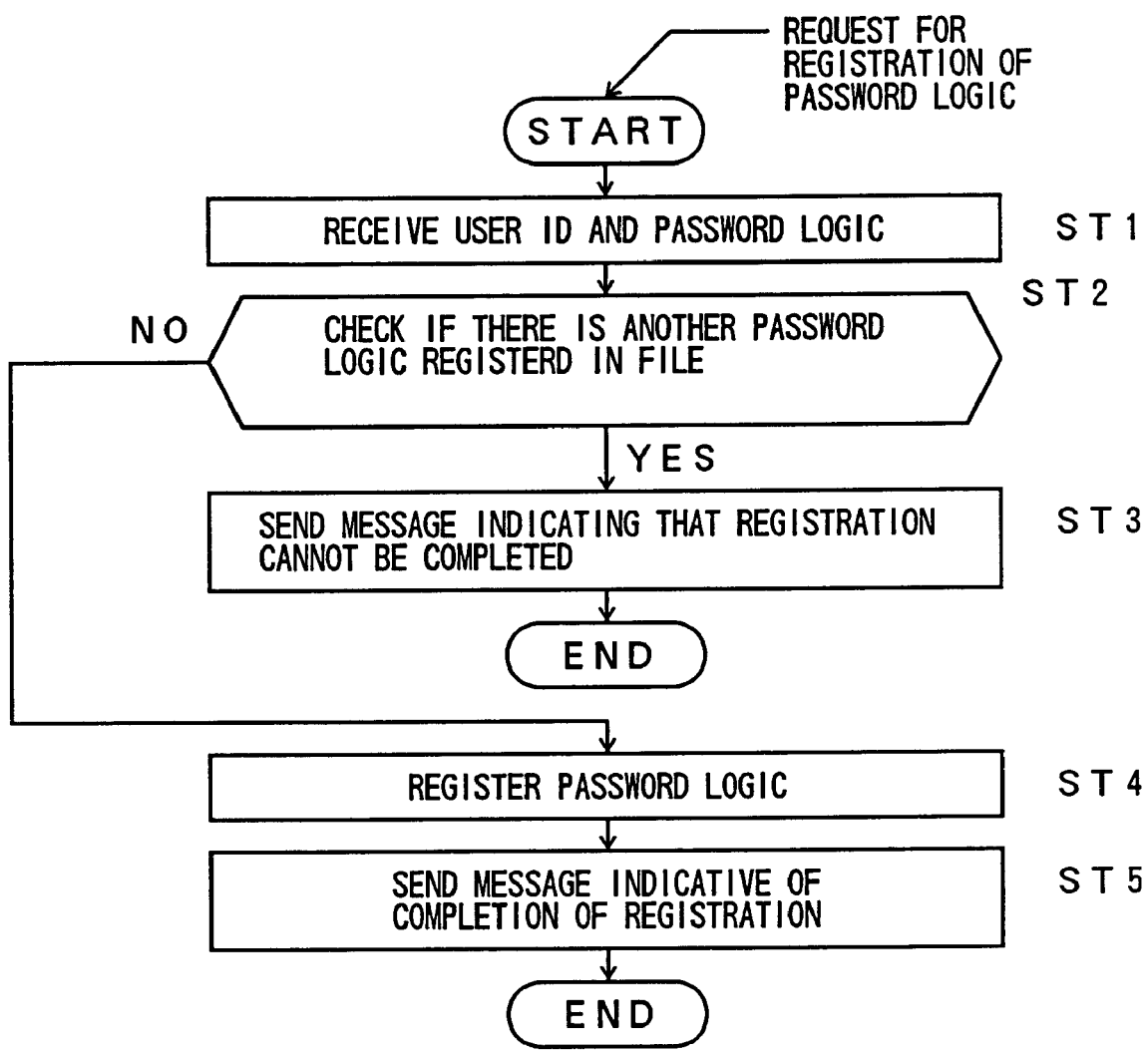

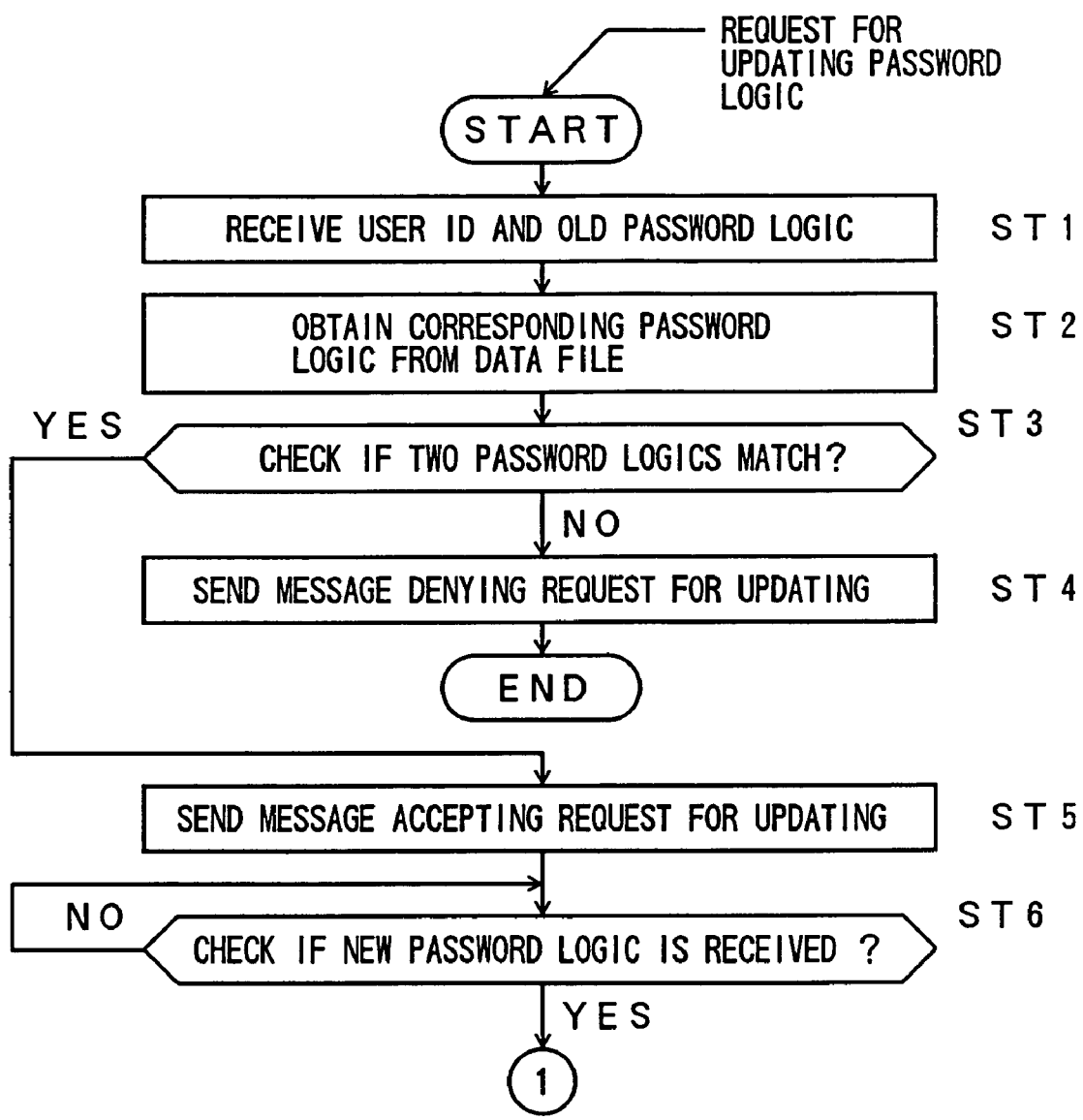

DEVICE AND METHOD FOR USER IDENTIFICATION CHECK BASED ON USER-SPECIFIC FORMULA

BACKGROUND OF THE INVENTION

1. Field of the Invention

The present invention generally relates to devices and methods for checking identification of users, an IC card for checking identification of the owner of the card, and a memory medium having program recorded therein for checking identification of a user. The present invention particularly relates to a user-identification check method, a user-identification check device, and a user identification check card, which achieve high security without imposing undue burden on users or on a system. The present invention further relates to a memory medium having a program embodied therein for achieving such a user-identification check device.

2. Description of the Related Art

As a result of an increasing use of computers in the fabric of society, checking a user identification based on a computer system has begun to be widely used in various fields relating to information processing. In the event that the checking of the user identification errs or misuse of the user identification is not prevented, ramifications include not only damages to individuals but also widespread confusion in society. Society demands a technology that achieves higher security in the checking of user identification.

The scheme most widely used for a user identification check is to let a user pick and register a pin code such as defined by 4 digits. When a user identification needs to be checked, the user enters his/her pin code, and a check is made as to whether the entered pin code and the registered pin code match. A match indicates that the user is authorized.

When a pin code is fixed as defined by a series of fixed digits, someone who sees a user entering a pin code may be able to pick up the code. This compromises security.

Further, users tend to select a pin codes that are easy to remember for them, such as a selected portion of their phone number, the date of birth, the home address, etc. Such a tendency increases a chance of someone correctly guessing a user's pin number. This is also a factor in compromising the security.

In order to obviate the drawbacks described above, Japanese Patent Laid-open Application No. 63-170764 teaches a system in which a user registers a formula and a key number. At a time of user-identification check, the system generates a time-dependent variable. A user enters a number that produces the key number when the entered number is inserted into the registered formula. The number entered by the user is compared with a number calculated by the system. If these two numbers match, the user is authorized.

In the user-identification-check system described above, a user registers a formula "x+y" and a key number "$z_0=7$", for example. When the system presents a time-dependent variable 3 (=x), a user enters 4 (=y) that satisfies the equation "x+y=7". Entering such a number proves that the user is an authorized user.

The check of user identification as described above can maintain security even when someone sneakily picks up a number that a user enters. This is because the number that the user enters is not a fixed code such as a pin code. This scheme thus provides higher security.

In this scheme, however, a user needs to remember both the registered formula and the key number, and to calculate a required number in his head. This poses a great burden on a part of the user.

Further, the system also bears the burden in that the system needs to store in memory the registered formula and the registered key number for each user. This requires a large memory size.

Accordingly, there is a need for a scheme which can achieve high security without imposing an undue burden on users or on the system.

SUMMARY OF THE INVENTION

Accordingly, it is a general object of the present invention to provide a scheme which satisfies the need described above.

It is another and more specific object of the present invention to provide a scheme which can achieve high security without imposing undue burden on users or on the system.

In order to achieve the above objects according to the present invention, a device for checking user identification includes a calculation unit which calculates a check value by applying a user-specific formula to at least one randomly generated number, and a matching unit which checks if the check value matches a user-entered value that is entered by a user in response to said at least one randomly generated number presented to the user.

In the device described above, the random number is presented to the user, and the check value is obtained from the random number and the user-specific formula. Then, the check value is compared with the user-entered value that is entered by the user in response to the random number presented to the user. A match in the comparison indicates that the user is authorized. This device insures high-level security since secrecy of the user-specific formula is maintained even when someone surreptitiously picks up the number entered by the user.

Moreover, the user needs to remember only his/her user-specific formula and nothing else. Likewise, the system needs to store only a formula for each user. High-level security is thus achieved without imposing excessive burden on the user or on the system.

Other objects and further features of the present invention will be apparent from the following detailed description when read in conjunction with the accompanying drawings.

BRIEF DESCRIPTION OF THE DRAWINGS

FIG. 8 is an illustrative drawing showing an example of a password-logic-registration window;

FIG. 9 is an illustrative drawing showing an example of a password input window;

FIG. 10 is an illustrative drawing of a user-identification check system according to another embodiment of the present invention;

FIG. 12 is a flowchart of a process of registering a password logic performed by an identification-check-data control unit of FIG. 10;

FIGS. 14A and 14B is a flowchart of a process of updating a password logic performed by the identification-check-data control unit;

DESCRIPTION OF THE PREFERRED EMBODIMENTS

In the following, a principle and embodiments of the present invention will be described with reference to the accompanying drawings.

Figure 1:
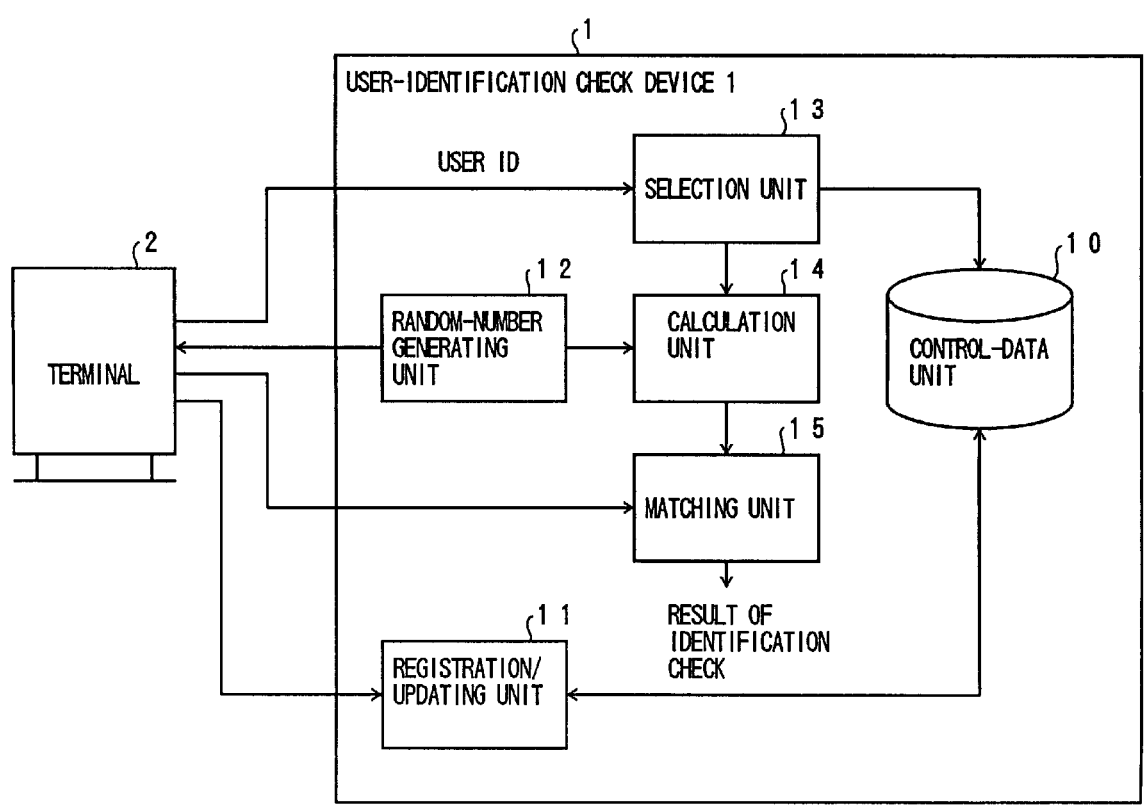
FIG. 1 is a block diagram of a user-identification check system according to a principle of the present invention.

FIG. 1 is a block diagram of a user-identification check system according to a principle of the present invention.

In FIG. 1, a user-identification check device 1 performs a process of checking user identification. A terminal 2 is provided for the user-identification check device 1, and provides a user with a means to interact with the user-identification check device 1.

The user-identification check device 1 according to the present invention includes a control-data unit 10, a registration/updating unit 11, a random-number generating unit 12, a selection unit 13, a calculation unit 14, and a matching unit 15.

The control-data unit 10 keeps correspondences between user IDs and formulas associated with the users. Depending on a user, a series of digits is provided in place of a formula. The registration/updating unit 11 is used for registering or updating formulas in the control-data unit 10. The random-number generating unit 12 generates a series of a predetermined number of random digits (or one digit), and presents the series of random digits to a user.

The selection unit 13 selects a formula corresponding to an indicated user ID from the control data of the control-data unit 10. The calculation unit 14 calculates a number to be used for the identification purpose by using the random number (i.e., the series of random digits) generated by the random-number generating unit 12 and the formula selected by the selection unit 13. The matching unit 15 checks whether a number entered by a user in response to the presentation of the random digits matches the number calculated by the calculation unit 14. A match indicates that the user is authorized.

The functions of the user-identification check device 1 are normally implemented via software programs running on a computer.

Figure 2:
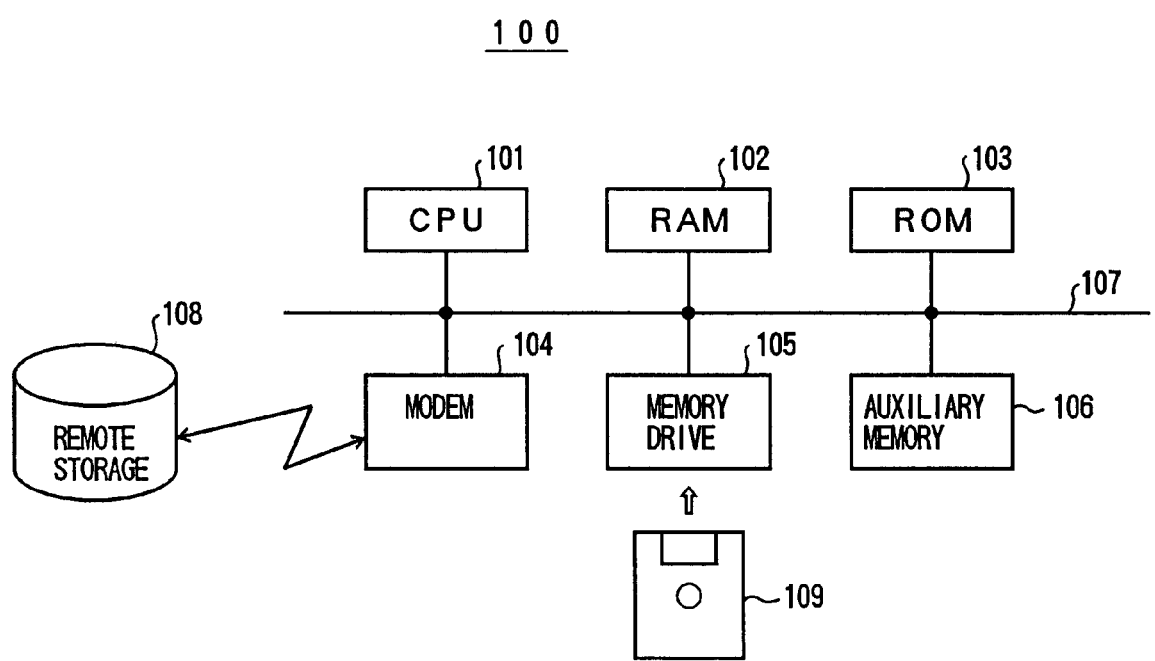
FIG. 2 is an illustrative drawing showing an example of a computer which implements a user-identification check device of FIG. 1.

FIG. 2 is an illustrative drawing showing an example of a computer which implements the user-identification check device 1.

A computer 100 of FIG. 2 includes a CPU 101, a RAM 102, a ROM 103, a MODEM 104, a memory drive 105, an auxiliary memory 106, and a bus 107 connecting these elements together. A user-identification program is stored in a remote storage 108 connected to the modem 104 via a communication line, and/or is stored in a memory medium 109 such as a floppy disk, a CD-ROM, a memory card, or the like. The user-identification program is loaded to the computer 100 from the remote storage 108 via the modem 104 or from the memory medium 109 via the memory drive 105. The loaded program may be stored in the auxiliary memory 106 for subsequent loading to the RAM 102, or may be directly stored in the RAM 102. The CPU 101 executes the user-identification program stored in the RAM 102 by using an available memory space of the RAM 102 as its work area, and performs functions of the registration/updating unit 11, the random-number generating unit 12, the selection unit 13, the calculation unit 14, and the matching unit 15. The auxiliary memory 106 serves as the control-data unit 10. Further, the ROM 103 stores programs therein for controlling basic operations of the computer 100.

Not only the configuration of FIG. 1 may be implemented on the computer 100 of FIG. 2, but also other configurations of embodiments, which will be described later, may be implemented on a computer such as the computer 100 shown in FIG. 2.

With reference to FIG. 1 again, the registration/updating unit 11 receives a formula (or a series of digits) entered in the terminal 2, and registers the formula and a relevant user ID as a pair in the control-data unit 10. When there is a request for updating a formula registered in the control-data unit 10, the registration/updating unit 11 receives a new formula from the terminal 2, and updates an old formula to a new formula. This is performed only when the old formula is entered as a proof of authority to update the formula.

In this manner, through operations of the registration/updating unit 11, the control-data unit 10 keeps correspondences between the user IDs and the formulas (or digits) associated with users.

When a check of user identification is requested with indication of a user ID, the selection unit 13 selects a formula corresponding to the indicated user ID from the control data of the control-data unit 10. In response to the request, also, the random-number generating unit 12 generates a random number, and presents it on the display screen of the terminal 2. The random number is supplied to the calculation unit 14.

In response, the calculation unit 14 calculates a number for the user-identification purpose by referring to the random number generated by the random-number generating unit 12 and the formula selected by the selection unit 13. The matching unit 15 checks whether a number entered in the terminal 2 in response to the presentation of the random number matches the number calculated by the calculation unit 14, thereby checking the identification of the user.

When a series of digits with no calculus operator included therein is selected in place of a formula, the calculation unit 14 outputs the series of digits as it is. This makes it possible to incorporate use of conventional pin numbers in the user-identification check system.

A time-dependent variable such as that which changes from 1 to 12 according to the current month may be included in the formula. In such a case, the calculation unit 14 uses the time-dependent variable and the random number generated by the random-number generating unit 12 to calculate a number for the identification purpose based on the formula selected by the selection unit 13.

The time-dependent variable may be created in various manners to indicate a time of user identification. That is, it may be created by combining part or all of the year and date (yyyy.mm.dd), time (hh.mm.ss), AM/PM (e.g., AM=0, PM=1), day (e.g., Monday=1, Tuesday=2, and so on).

As described above, the user-identification check device 1 registers formulas associated with users, and presents a generated random number to a user. A user enters a number in response to the presentation of the random number. The user-identification check device 1 checks if the user-entered number matches a number calculated from a selected formula and the generated random number, thereby checking if the user is authorized. This configuration maintains security even when someone surreptitiously picks up a number entered by a user.

When this system is used in a network environment, it is made sure that the formulas associated with users are not sent through the network. This insures higher security than a conventional system where pin numbers need to be sent through the network.

The user-identification check scheme of Japanese Patent Laid-open Application No. 63-170764 as previously described requires a user to remember both a formula and a key number. On the other hand, the present invention requires the user to remember only his/her formula. Further, the scheme of the above document demands that the system store formulas and key numbers in its memory. The present invention, on the other hand, suffice only if the system stores formulas in its memory. The present invention thus provides high security without imposing undue burden on the users or on the system.

Further, according to the present invention, a user-identification-check card may be provided for a user, and stores therein the user's formula. This configuration also achieves high security.

In the following, embodiments of the present invention will be described with the accompanying drawings.

Figure 3:
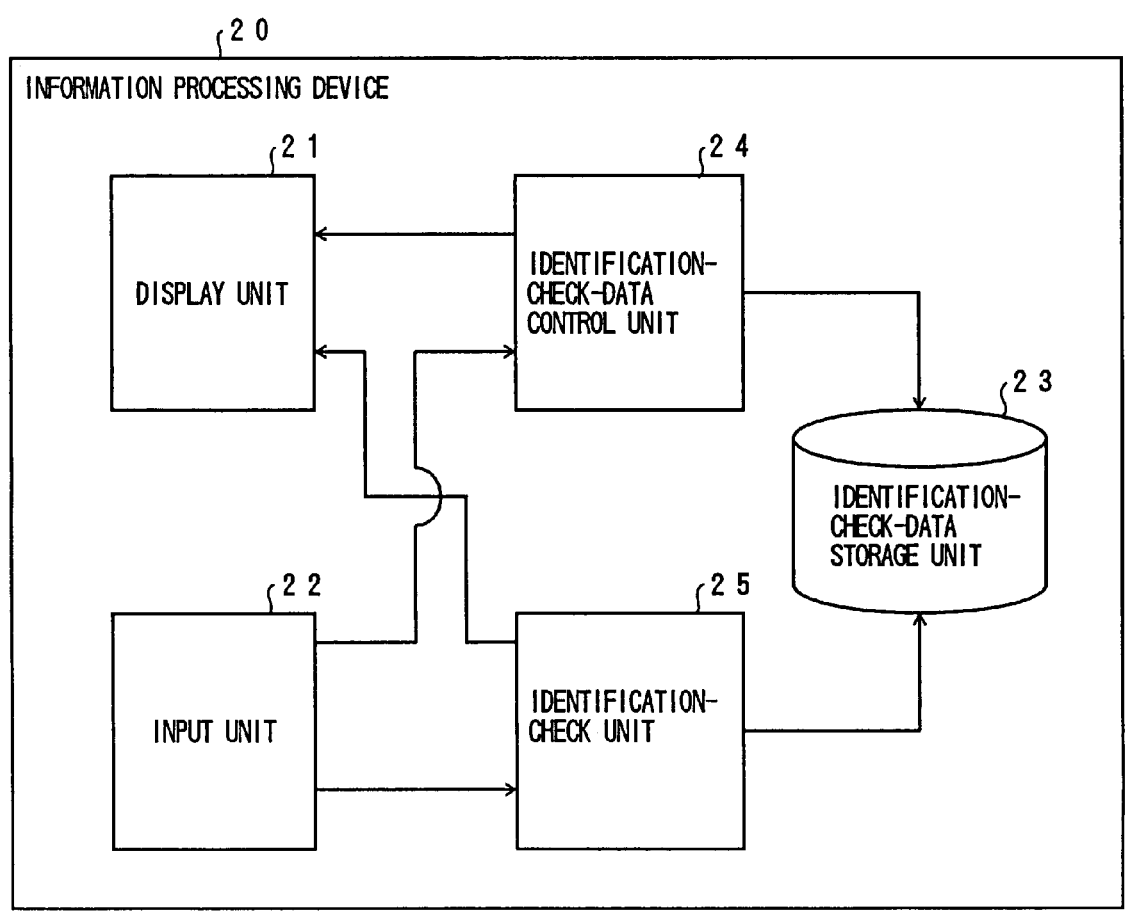
FIG. 3 is a block diagram of an information processing device which implements user-identification check according to an embodiment of the present invention.

FIG. 3 is a block diagram of an information processing device which implements user-identification check according to an embodiment of the present invention.

An information processing device 20 of FIG. 3 includes a display unit 21 such as a CRT, an input unit 22 such as a keyboard and a mouse, an identification-check-data storage unit 23, an identification-check-data control unit 24, and an identification-check unit 25. The identification-check-data storage unit 23 stores therein data that is necessary for user-identification check. The identification-check-data control unit 24 attends to registration and updating of the identification-check data stored in the identification-check-data storage unit 23, and is implemented via a program installed through a floppy disk, a communication line, or the like. The identification-check unit 25 performs a user-identification-check process by referring to the identification-check data stored in the identification-check-data storage unit 23, and is implemented via a program installed through a floppy disk, a communication line, or the like.

Figure 4:
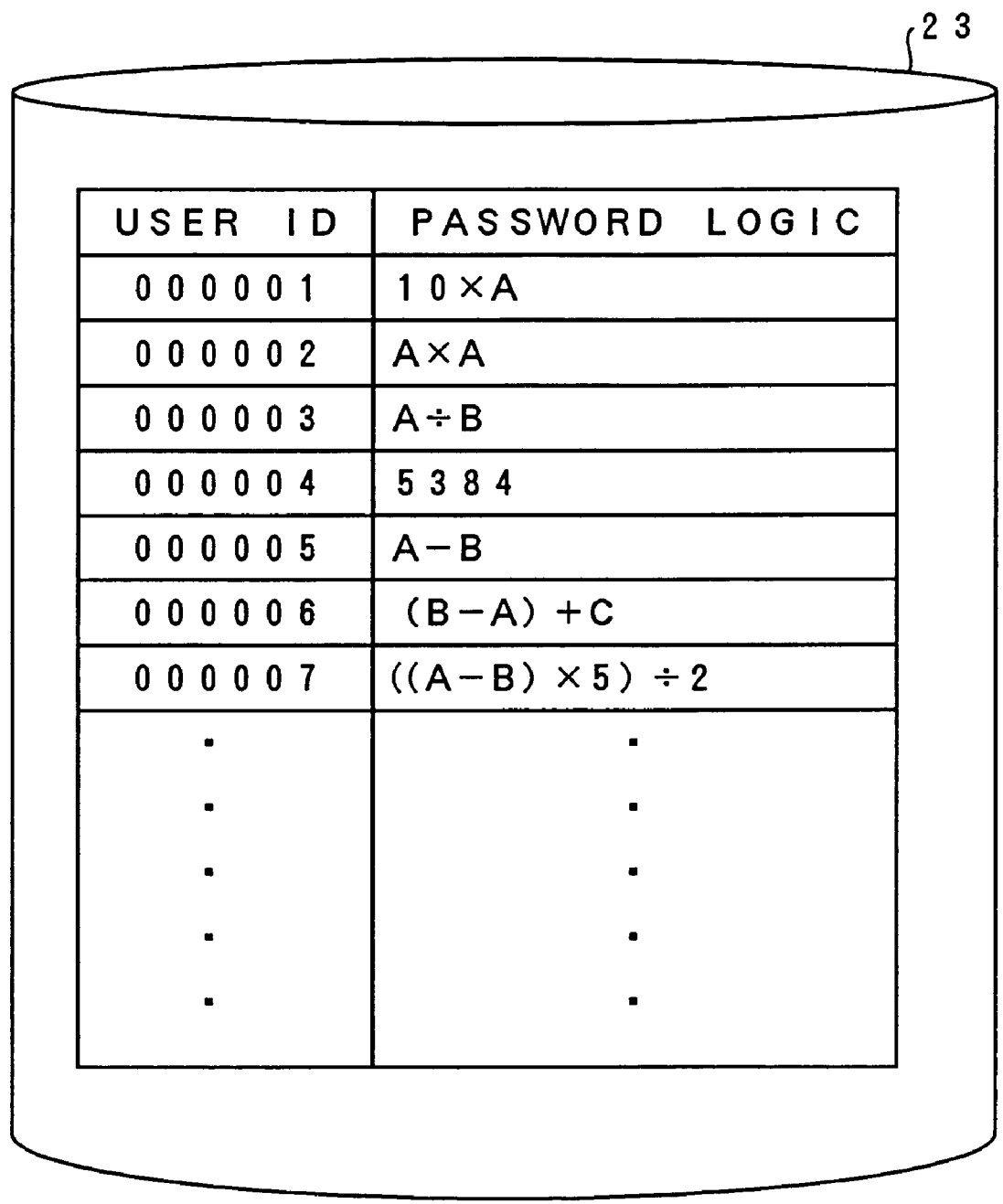
FIG. 4 is an illustrative drawing showing an example of identification-check data stored in an identification-check-data storage unit of FIG. 3.

FIG. 4 is an illustrative drawing showing an example of the identification-check data stored in the identification-check-data storage unit 23.

As shown in the figure, the identification-check-data storage unit 23 stores paired user IDs and password logics where the password logics are registered by respective users. Depending on user preference, a given password logic may be a simple personal identification number.

The password logics generally define formulas, which are applied to random digits generated by the identification-check unit 25. In the example shown in FIG. 4, a user having a user ID "000005" registered a password logic that calculates "A–B" when a 4-digit random number ABCD is presented. On the other hand, a user having a user ID "000004" registered a pin code "5348" rather than a formula, so that this pin code is stored in the identification-check-data storage unit 23.

In the example of FIG. 4, password logics are shown by using a general form of formula representation for the sake of simplicity. In practice, however, the password logics may be stored by using a special form of representation such as the Reversed Polish Notation.

According to the Reversed Polish Notation, the formulas shown in FIG. 4 are represented as follows:

$10 \times A \rightarrow 10A*$;

$A \times A \rightarrow AA*$;

$A \div B \rightarrow AB/$;

$A - B \rightarrow AB-$;

$(B-A)+C \rightarrow BA-C+$; and $((A-B) \times 5) \div 2 \rightarrow AB-5*2/$.

Use of such a form of representation makes it more difficult to decipher codes, thereby enhancing level of security.

Figure 5:
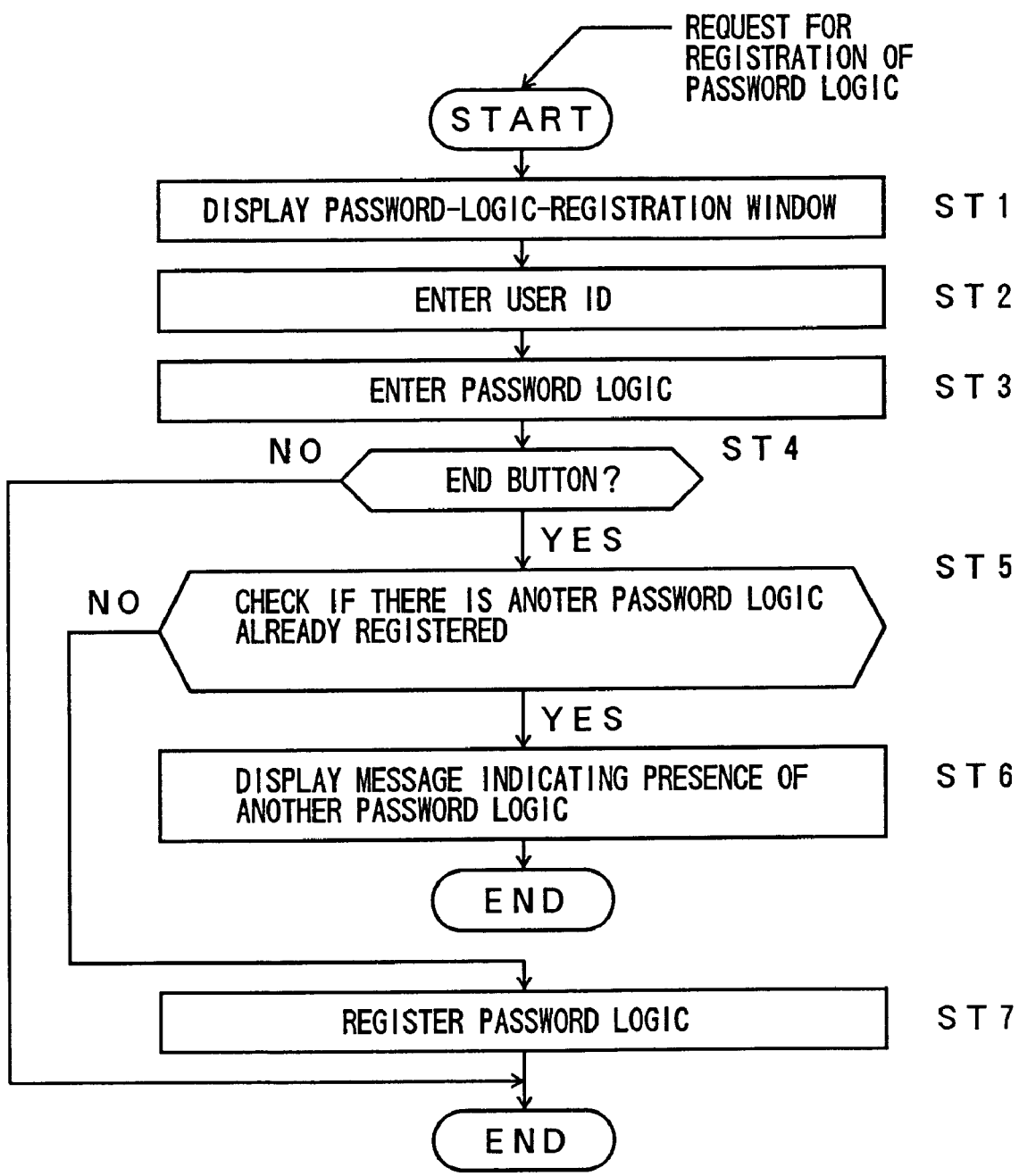
FIG. 5 is a flowchart of a process of registering a password logic performed by an identification-check-data control unit of FIG. 3.

FIG. 5 is a flowchart of a process of registering a password logic performed by the identification-check-data control unit 24.

At a step ST1, upon a request for registration of a password logic, the identification-check-data control unit 24 displays a password-logic-registration window on the display unit 21. FIG. 8 is an illustrative drawing showing an example of the password-logic-registration window.

At a step ST2, a user enters a user ID in the password-logic-registration window.

At a step ST3, the user enters a password logic in the password-logic-registration window.

As will be described later in detail, the identification-check unit 25 generates a 4-digit random number ABCD (each digit ranges from 0 to 9). With respect to this random number, a user defines his/her own formula that is to be applied to the four digits of the random number. Here, the user does not have to use each one of the four digits, and is allowed to include parentheses in his/her formula. The identification-check-data control unit 24 receives the user-defined password logic, and registers it. If the user wishes to use a conventional pin code, the user simply enters a pin code comprised of four digits. The identification-check-data control unit 24 then registers this pin code.

At a step ST4, a check is made as to whether the user operates an END button (i.e., a button for finishing a registration process). If a CANCEL button is operated, the procedure comes to an end. If the END button is operated, the procedure goes to a step ST5.

At the step ST5, a check is made as to whether the user has another password logic already registered in the identification-check-data storage unit 23.

If the step ST5 finds that another password logic is already in place in the identification-check-data storage unit 23, at a step ST6, the identification-check-data control unit 24 displays a message indicating presence of an already registered password logic on the display unit 21, thereby informing the user that the password logic entered at the step ST3 is not registered. The procedure comes to an end after the step ST6.

If the step ST5 finds that the user has no password logic registered in the identification-check-data storage unit 23, at a step ST7, the identification-check-data control unit 24 stores the password logic entered at the step ST3 together with a user ID of the user as a pair in the identification-check-data storage unit 23. Then, the procedure comes to an end.

In this manner, the identification-check-data control unit 24 registers a user-defined password logic in the identification-check-data storage unit 23 when a user issues a request for password-logic registration.

Figure 6:
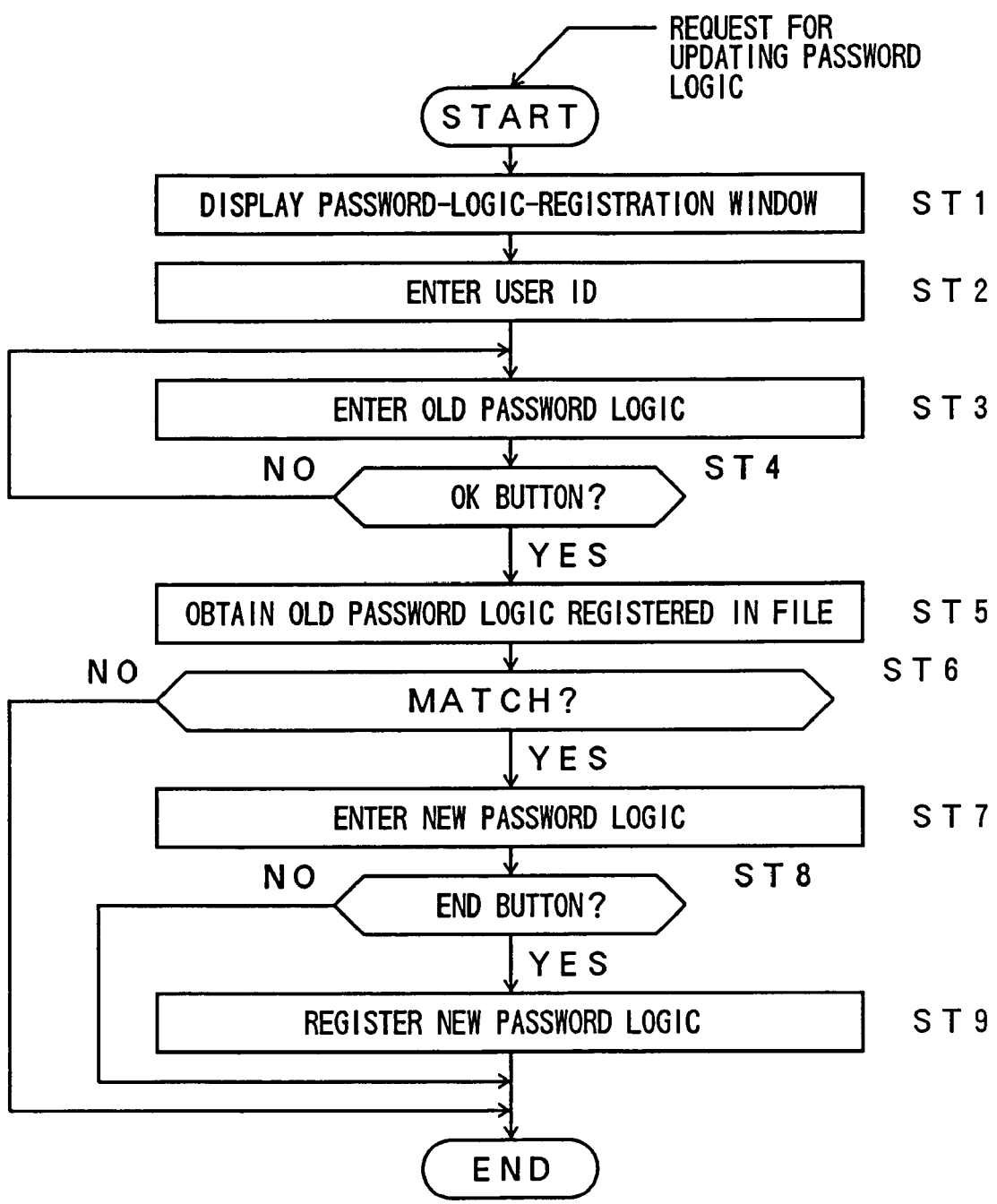
FIG. 6 is a flowchart of a process of updating a password logic performed by the identification-check-data control unit.

FIG. 6 is a flowchart of a process of updating a password logic performed by the identification-check-data control unit 24.

At a step ST1, upon a request for updating a password logic, the identification-check-data control unit 24 displays a password-logic-registration window on the display unit 21 as shown in FIG. 8.

At a step ST2, a user enters a user ID in the password-logic-registration window.

At a step ST3, the user enters an old password logic in the password-logic-registration window.

At a step ST4, a check is made as to whether the user operates an OK button (i.e., a button for entering the old password logic). If the OK button is operated, the procedure goes to a step ST5.

At the step ST5, an old password logic registered in the identification-check-data storage unit 23 is obtained from the identification-check-data storage unit 23.

At a step ST6, a check is made as to whether the old password logic entered at the step ST3 matches the old password logic obtained at the step ST5. If there is no match, it is ascertained that the user does not know the correct password logic, so that the procedure ends without authorizing the updating of password logic.

If the step ST6 finds that the two password logics match, the procedure goes to a step ST7, where the user enters a new password logic.

At a step ST8, a check is made as to whether the user operates an END button (i.e., a button for finishing a registration process). If a CANCEL button is operated, the procedure comes to an end. If the END button is operated, the procedure goes to a step ST9.

At the step ST9, the identification-check-data control unit 24 updates the old password logic with the new password logic in the identification-check-data storage unit 23. The procedure then comes to an end.

In this manner, the identification-check-data control unit 24 updates a password logic stored in the identification-check-data storage unit 23 upon a user request for updating a password logic only if the user knows the old password logic stored in the identification-check-data storage unit 23.

According to the flowcharts of FIGS. 5 and 6, the identification-check-data storage unit 23 registers paired user IDs and password logics (or pin numbers) in the identification-check-data storage unit 23.

Figure 7A:
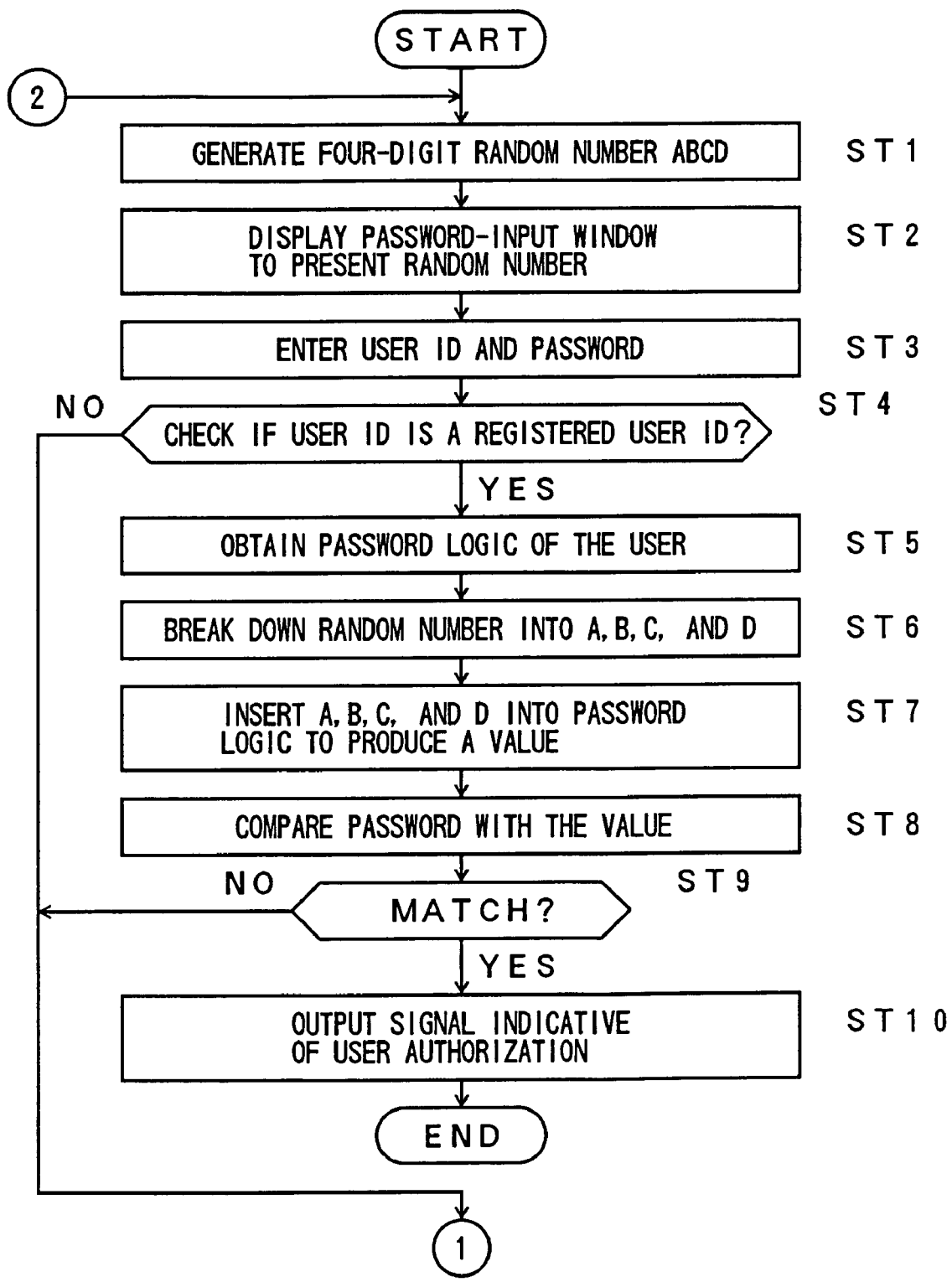
FIGS. 7A and 7B is a flowchart of a process of checking user identification performed by an identification-check unit of FIG. 3.
Figure 7B:
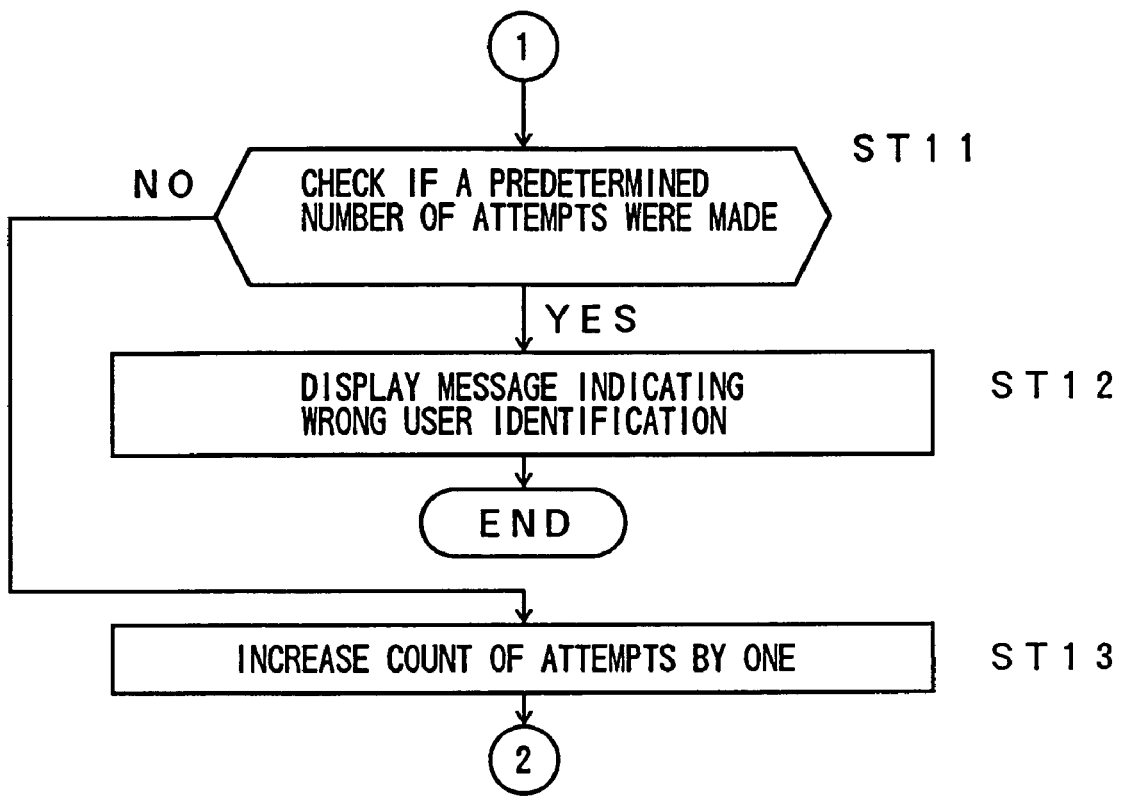

FIGS. 7A and 7B is a flowchart of a process of checking user identification performed by the identification-check unit 25.

At a step ST1, upon a user request for identification check, the identification-check unit 25 generates a four-digit random number as represented by ABCD.

At a step ST2, the identification-check unit 25 displays a password-input window on the display unit 21, and presents the generated random number in the window. If a random number "4361" is generated, for example, this number is presented to a user. FIG. 9 is an illustrative drawing showing an example of the password input window.

At a step ST3, the user enters a user ID and a password.

The password entered by the user is calculated by applying the password logic registered in the identification-check-data storage unit 23 to the digits A, B, C, and D of the random number generated by the identification-check unit 25. If a random number "4361" is generated by the identification-check unit 25, and if the user has a registered password logic "A+B+C+D", the user calculates "4+3+6+1" to obtain a password "14". The user then enters the obtained password in the password-input window.

If a password logic has a division operation that has "0" as its denominator, the identification-check unit 25 substitutes "0" for the result of the division operation. The user has to follow this rule to obtain a password. Further, if a password logic has a division operation that produces a remainder, the identification-check unit 25 discards digits below a decimal point. The user has to obey this rule when obtaining a password. Moreover, the identification-check unit 25 obtains an absolute value of a result of the password logic operation when the result of the password logic operation becomes negative. The user needs to respect this rule as well. The rules described above are merely an example, and other rules may be set forth when appropriate.

When the user has a pin code registered in the identification-check-data storage unit 23, the user enters the pin code as a password in the password-input window.

At a step ST4, a check is made as to whether the user ID entered at the step ST3 is found as a registered user ID in the identification-check-data storage unit 23.

If the step ST4 finds that the user ID is a registered user ID, at a step ST5, a password logic registered for the user is obtained by referring to the identification-check-data storage unit 23.

At a step ST6, the random number generated at the step ST1 is broken down into four separate digits A, B, C, and D.

At a step ST7, the four digits are inserted into the password logic obtained at the step ST5 to produce a value corresponding to the password entered by the user.

In so doing, the identification-check unit 25 substitutes "0" for a result of a division operation if the division operation in the password logic has "0" as its denominator, and discards digits below a decimal point if a division operation in the password logic produces a remainder. Moreover, the identification-check unit 25 obtains an absolute value of a result of the password logic operation when the result of the password logic operation becomes negative, and outputs a pin code if the pin code is defined in place of a password logic.

At a step ST8, the password entered at the step ST3 is compared with the value obtained at the step ST7.

At a step ST9, a check is made as to whether the comparison indicates a match. If there is a match, the procedure goes to a step ST10, where the identification-check unit 25 outputs a signal (data) indicative of authorization of the user. In response, a program for predetermined business processing starts operation thereof. This ends the procedure.

If the step ST4 finds that the entered user ID is not a registered user ID, or if the step ST9 finds that the entered password does not match the obtained value, the procedure goes to a step ST11 of FIG. 7B.

At the step ST11, a check is made as to whether the user-identification check has been attempted a predetermined number of times. If the predetermined number of attempts have been made, the procedure goes to a step ST12, where the identification-check unit 25 displays a message indicating a wrong user identification on the display unit 21. This ends the procedure.

If the step ST11 finds that the user-identification check has not been attempted the predetermined number of times, the procedure goes to a step ST13, where a count of the number of attempts is increased by one. Then, the procedure goes back to the step ST1 to repeat the user-identification-check process as described above.

In this manner, the identification-check unit 25, upon a user request for identification check, obtains a value by using a user-defined password logic registered in the identification-check-data storage unit 23 and a random number, and compares the obtained value with a password that is entered by the user in response to the random number presented to the user, thereby making a proper user-identification check.

Use of such user-identification check insures high-level security even if someone surreptitiously picks up a number that the user enters. The user needs to remember only his/her password logic and nothing else. Likewise, the system needs to store only a password logic for each user. High-level security is thus achieved without imposing excessive burden on the user or on the system.

Further, the embodiment described above is applicable to a case where conventional pin codes are used as an option. In this manner, this embodiment can cope with various user preferences including use of a pin code if the user so wishes.

FIG. 10 is an illustrative drawing of a user-identification check system according to another embodiment of the present invention.

In this embodiment, the present invention is applied to a distribution-management system operating in a network environment.

The distribution-management system of FIG. 10 includes an identification-check server 30, a plurality of distribution terminals 40, and a network 50 connecting between the identification-check server 30 and the distribution terminals 40. The identification-check server 30 attends to user-identification check. The distribution terminals 40 are provided at the end of distributors.

The identification-check server 30 includes an identification-check-data storage unit 31, an identification-check-data control unit 32, and an identification-check unit 33. The identification-check-data storage unit 31 stores data in the same format as the identification-check-data storage unit 23 of FIG. 3. The identification-check-data control unit 32 attends to registration and updating of the identification-check data stored in the identification-check-data storage unit 31, and may be implemented as a software program installed from a floppy disk, CD-ROM, or the like, or installed from a remote storage via a communication line. The identification-check unit 33 performs a user-identification-check process by referring to the identification-check data stored in the identification-check-data storage unit 31, and may be implemented as a software program installed from a floppy disk, CD-ROM, or the like, or installed from a remote storage via a communication line.

A distribution terminal 40 includes a display unit 41 such as a CRT, an input unit 42 such as a keyboard and a mouse, and an interaction unit 43. The interaction unit 43 provides a user with a means to interact with the system, and may be implemented as a software program installed from a floppy disk, CD-ROM, or the like, or installed from a remote storage via a communication line.

Figure 11:
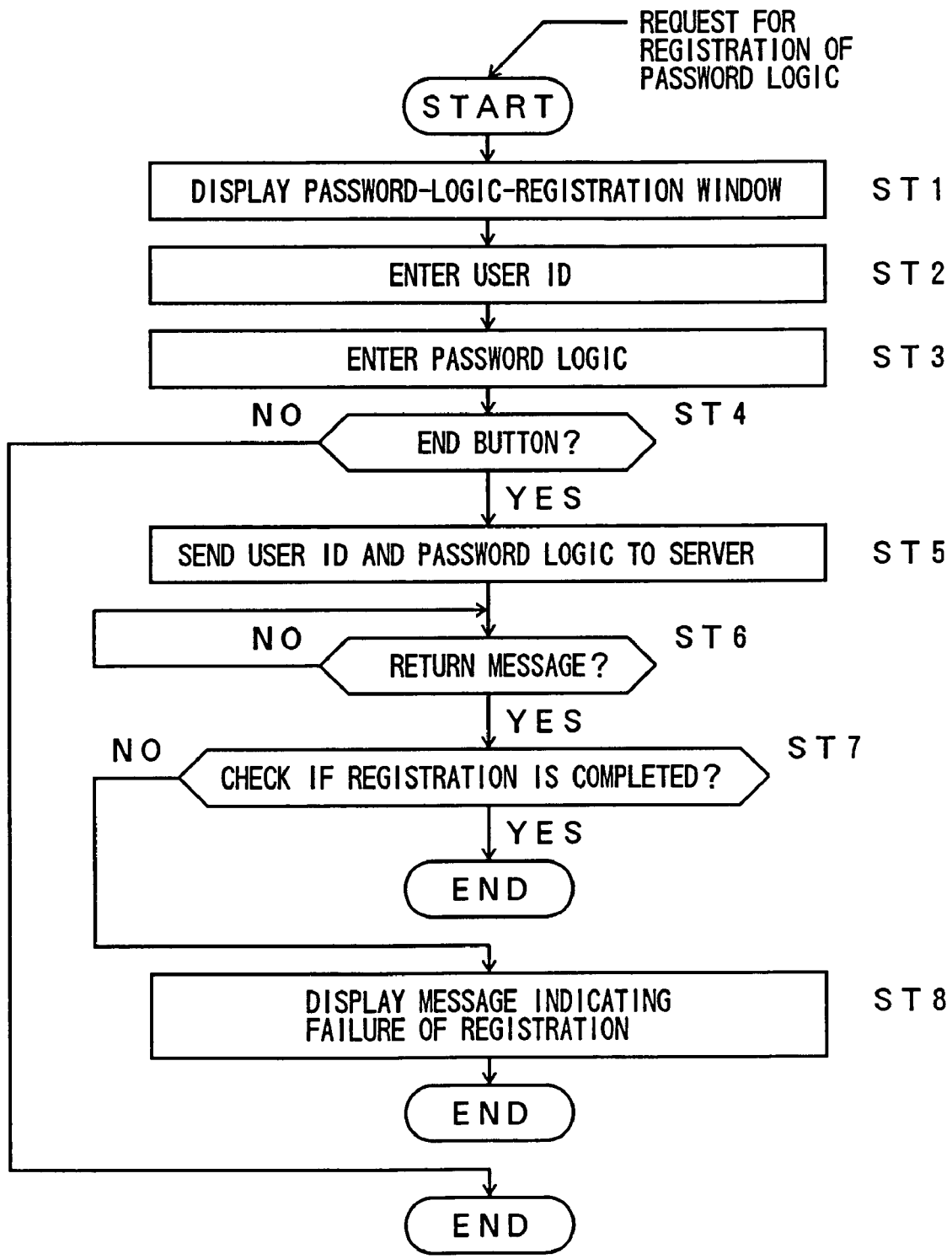
FIG. 11 is a flowchart of a process of registering a password logic performed by an interaction unit of FIG. 10.

FIG. 11 is a flowchart of a process of registering a password logic performed by the interaction unit 43.

At a step ST1, upon a request for registration of a password logic, the interaction unit 43 of the distribution terminal 40 displays a password-logic-registration window on the display unit 41 as shown in FIG. 8.

At a step ST2, a user enters a user ID in the password-logic-registration window.

At a step ST3, a user enters a user-defined password logic in the password-logic-registration window. This password logic is of the same type as that used in the previous embodiment.

At a step ST4, a check is made as to whether the user operates an END button (i.e., a button for activating a registration process). If a CANCEL button is operated, the procedure comes to an end. If the END button is operated, the procedure goes to a step ST5.

At the step ST5, the interaction unit 43 sends the entered user ID and password logic to the identification-check-data control unit 32 of the identification-check server 30.

As will be described later in detail, the identification-check-data control unit 32 returns a message in response to the transmission of the user ID and the password logic, and the message indicates whether registration of the password logic is completed.

At a step ST6, a check is made as to whether this return message is received from the identification-check-data control unit 32. When the message is received, the procedure goes to a step ST7.

At the step ST7, a check is made as to whether the message indicates that registration of the password logic is completed.

If the step ST7 finds that registration of the password logic is completed, the procedure comes to an end. If the step ST7 finds that registration is not completed, at a step ST8, the interaction unit 43 presents a message on the display unit 41 to indicate that registration of the password logic has failed. Then, the procedure comes to an end.

FIG. 12 is a flowchart of a process of registering a password logic performed by the identification-check-data control unit 32.

At a step ST1, upon a request by the interaction unit 43 to register a password logic, the identification-check-data control unit 32 of the identification-check server 30 receives the user ID and the password logic from the interaction unit 43.

At a step ST2, a check is made as to whether a user indicated by the user ID has a password logic already registered in the identification-check-data storage unit 31. If there is an already registered password logic, the procedure goes to a step ST3, where the identification-check-data control unit 32 sends a message to the interaction unit 43 to indicate that registration of the password logic cannot be completed. Then, the procedure comes to an end.

If the step ST2 finds that the user indicated by the user ID does not have a password logic already registered in the identification-check-data storage unit 31, the procedure goes to a step ST4.

At the step ST4, the received password logic and the received user ID are registered as a pair in the identification-check-data storage unit 31.

At a step ST5, the identification-check-data control unit 32 sends a message indicative of completion of the registration to the interaction unit 43.

In this manner, the interaction unit 43 and the identification-check-data control unit 32 interact with each other via the network 50 when a user requests registration of a password logic, and collaboratively register the user-defined password logic in the identification-check-data storage unit 31.

Figure 13A:
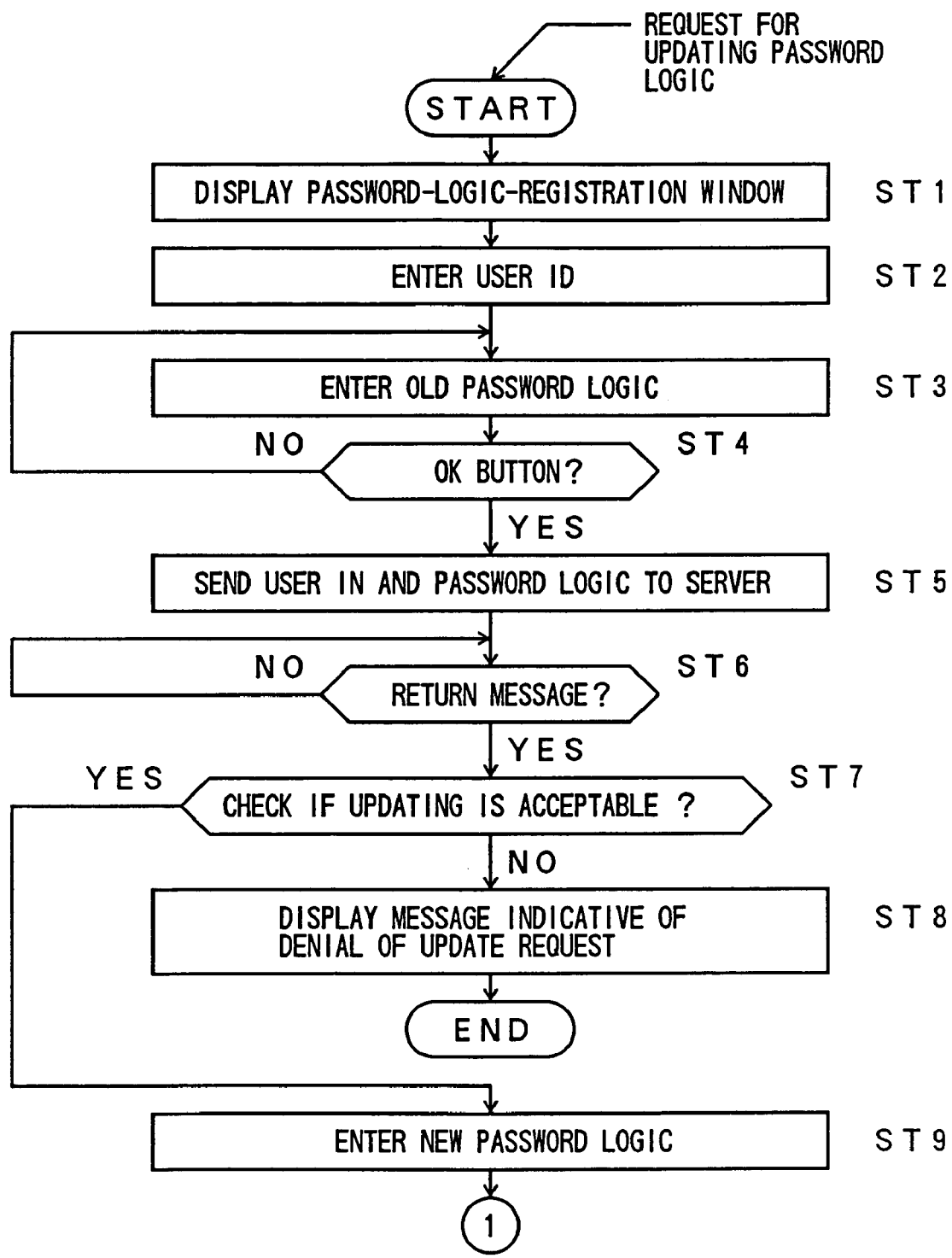
FIGS. 13A and 13B is a flowchart of a process of updating a password logic performed by the interaction unit.
Figure 13B:
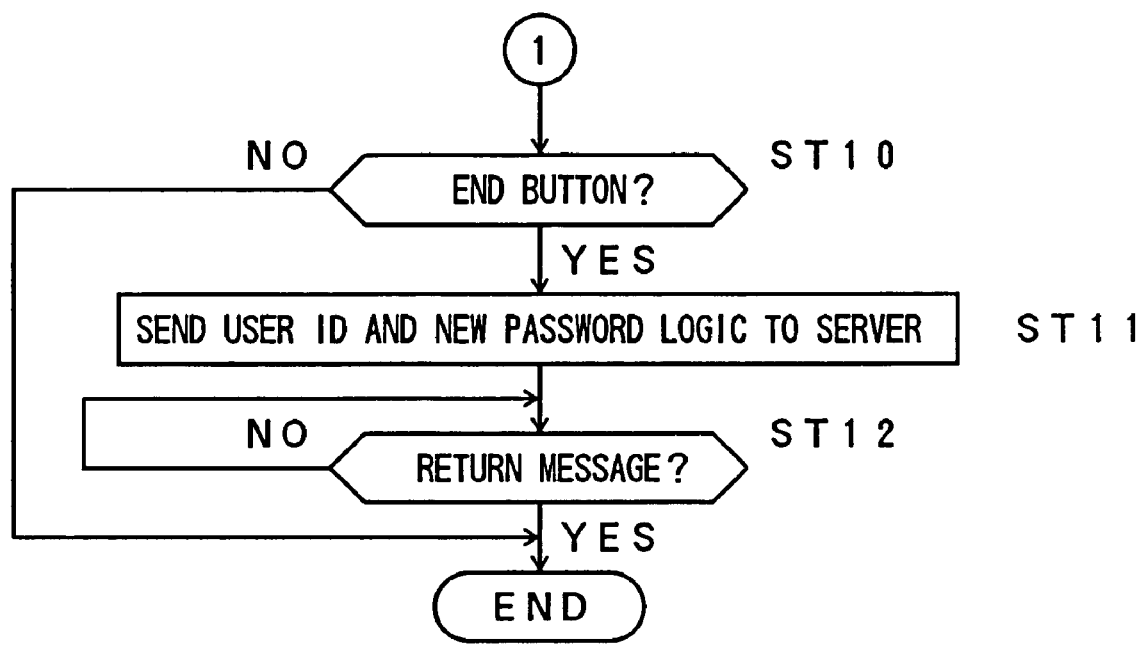

FIGS. 13A and 13B is a flowchart of a process of updating a password logic performed by the interaction unit 43.

At a step ST1, upon a user request for updating a password logic, the interaction unit 43 of the distribution terminal 40 displays a password-logic-registration window on the display unit 41 as shown in FIG. 8.

At a step ST2, the user enters a user ID in the password-logic-registration window.

At a step ST3, the user enters an old password logic in the password-logic-registration window.

At a step ST4, a check is made as to whether the user operates an OK button (i.e., a button for entering the old password logic). If the OK button is operated, the procedure goes to a step ST5.

At the step ST5, the interaction unit 43 sends the entered user ID and the entered old password logic to the identification-check-data control unit 32.

As will be described later in detail, the identification-check-data control unit 32 returns a message in response to the transmission of the user ID and the old password logic, and the message indicates whether updating of the password logic is acceptable.

At a step ST6, a check is made as to whether this return message is received from the identification-check-data control unit 32. When the message is received, the procedure goes to a step ST7.

At the step ST7, a check is made as to whether the message indicates that updating of the password logic is acceptable.

If the step ST7 finds that updating of the password logic is unacceptable, the procedure goes to a step ST8, where a message is presented on the display unit 41 to indicate that updating of the password logic is not acceptable. Then, the procedure comes to an end.

If the step ST7 finds that updating of the password logic is acceptable, the procedure goes to a step ST9, where the user enters a new password logic for the updating purpose.

At a step ST10 of FIG. 13B, a check is made as to whether the user operates an END button (i.e., a button for activating a registration process). If a CANCEL button is operated, the procedure comes to an end. If the END button is operated, the procedure goes to a step ST11.

At the step ST11, the interaction unit 43 sends the user ID and the new password logic entered at the step ST9 to the identification-check-data control unit 32.

As will be described later in detail, the identification-check-data control unit 32 returns a message in response to the transmission of the user ID and the new password logic, and the message indicates whether registration of the new password logic is completed.

At a step ST12, a check is made as to whether this return message is received from the identification-check-data control unit 32. When the message is returned, the procedure comes to an end.

Figure 14B:
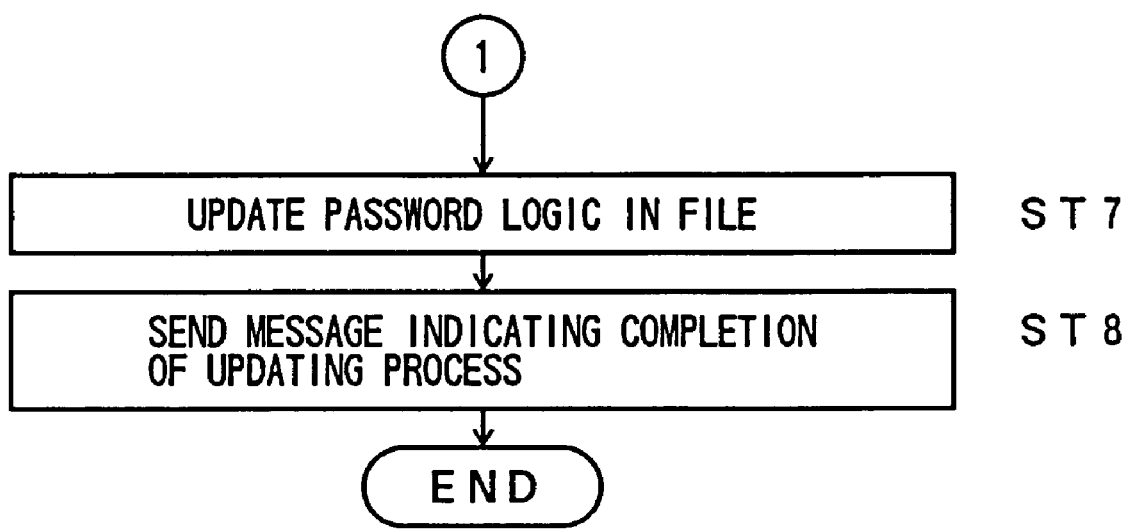

FIGS. 14A and 14B is a flowchart of a process of updating a password logic performed by the identification-check-data control unit 32.

At a step ST1, upon a request by the interaction unit 43 to update a password logic, the identification-check-data control unit 32 of the identification-check server 30 receives the user ID and the old password logic from the interaction unit 43.

At a step ST2, the identification-check-data control unit 32 refers to the identification-check-data storage unit 31 to obtain a password logic corresponding to the received user ID.

At a step ST3, a check is made as to whether the password logic obtained at the step ST2 matches the password logic received at the step ST1. If there is no match, the procedure goes to a step ST4, where a message indicative of denial of the updating request is send to the interaction unit 43. The procedure comes to an end.

If the step ST3 finds that the two password logics match, the procedure goes to a step ST5, where a message indicative of acceptance of the updating request is sent to the interaction unit 43.

As previously described, the interaction unit 43 responds to the message indicative of acceptance of the updating request sent from the identification-check-data control unit 32 by sending the user ID and a new password logic.

At a step ST6, a check is made as to whether the user ID and a new password logic are received from the interaction unit 43. When they are received, the procedure goes to a step ST7 of FIG. 14B.

At the step ST7 of FIG. 14B, the identification-check-data control unit 32 updates the old password logic indicated by the received user ID with the received new password logic in the identification-check-data storage unit 31.

At a step ST8, the identification-check-data control unit 32 sends a message indicating completion of a password-logic updating process to the interaction unit 43. This ends the procedure.

In this manner, the interaction unit 43 and the identification-check-data control unit 32 interact with each other via the network 50 when a user requests updating of a password logic, and collaboratively update the password logic in the identification-check-data storage unit 31 only if the user knows the old password logic.

Based on the procedures shown as flowcharts in FIG. 11 through FIGS. 14A and 14B, user IDs and password logics (or pin codes) associated with the user IDs are stored in the identification-check-data storage unit 31 of the identification-check server 30.

Based on this identification-check data stored in the identification-check-data storage unit 31, the interaction unit 43 and the identification-check unit 33 interact with each other via the network 50 to perform a user-identification check when a user requests a check of user identification.

Figure 15:
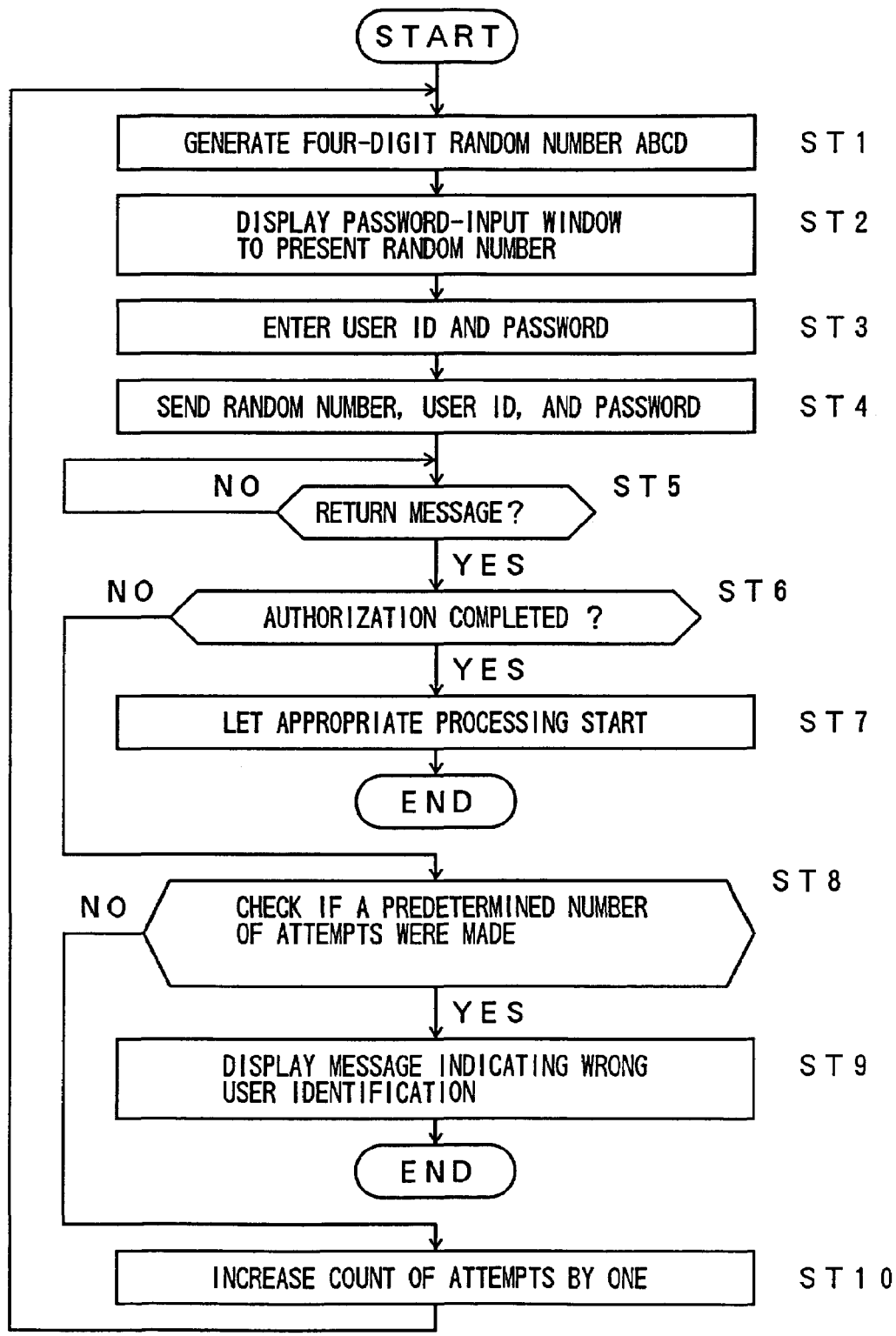
FIG. 15 is a flowchart of a process of checking user identification performed by the interaction unit.

FIG. 15 is a flowchart of a process of checking user identification performed by the interaction unit 43.

At a step ST1, upon a user request for identification check, the interaction unit 43 of the distribution terminal 40 generates a four-digit random number as represented by ABCD.

At a step ST2, the identification-check unit 25 displays a password-input window on the display unit 21 as shown in FIG. 9, and presents the generated random number in the window. If a random number "4361" is generated, for example, this number is presented to a user.

As will be described later, the random number generated at this step does not have to be a four-digit random number, but can be comprised of only one digit, two digits, or three digits. By the same token, the random number may be comprised of a larger number of digits more that four.

At a step ST3, the user enters a user ID and a password.

The password entered by the user is calculated by applying the password logic registered in the identification-check-data storage unit 31 to the digits A, B, C, and D of the random number generated by the interaction unit 43. If a password logic has a division operation that has "0" as its denominator, the user obtains the password by substituting "0" for the result of the division operation. Further, if a password logic has a division operation that produces a remainder, the user obtains the password by discarding digits below a decimal point. Moreover, the user obtains the password by calculating an absolute value of a result of the password logic operation when the result of the password logic operation becomes negative. When the user has a pin code registered in the identification-check-data storage unit 31, the user enters the pin code as the password in the password-input window.

At a step ST4, the interaction unit 43 sends the random number generated at the step ST1 and the user ID and password entered at the step ST3 to the identification-check unit 33.

As will be described later in detail, the identification-check unit 33 returns a message in response to the transmission of the random number, the user ID, and the password, and the message indicates whether the user is authorized by entering the password.

At a step ST5, a check is made as to whether this return message is received from the identification-check unit 33. When the message is received, the procedure goes to a step ST6.

At the step ST6, a check is made as to whether the return message indicates that user authorization is completed.

If the step ST6 finds that the message received from the identification-check unit 33 indicates completion of user authorization, at a step ST7, the interaction unit 43 outputs a signal (data) indicative of authorization of the user. In response, a program for business processing starts operation thereof. This ends the procedure.

If the step ST6 finds that the message received from the identification-check unit 33 indicates denial of user authorization, the procedure goes to a step ST8.

At the step ST8, a check is made as to whether the user-identification check has been attempted a predetermined number of times. If the predetermined number of attempts have been made, the procedure goes to a step ST9, where the interaction unit 43 displays a message indicating a wrong user identification on the display unit 41. This ends the procedure.

If the step ST8 finds that the user-identification check has not been attempted the predetermined number of times, the procedure goes to a step ST10, where a count of the number of attempts is increased by one. Then, the procedure goes back to the step ST1 to repeat the user-identification-check process as described above.

Figure 16:
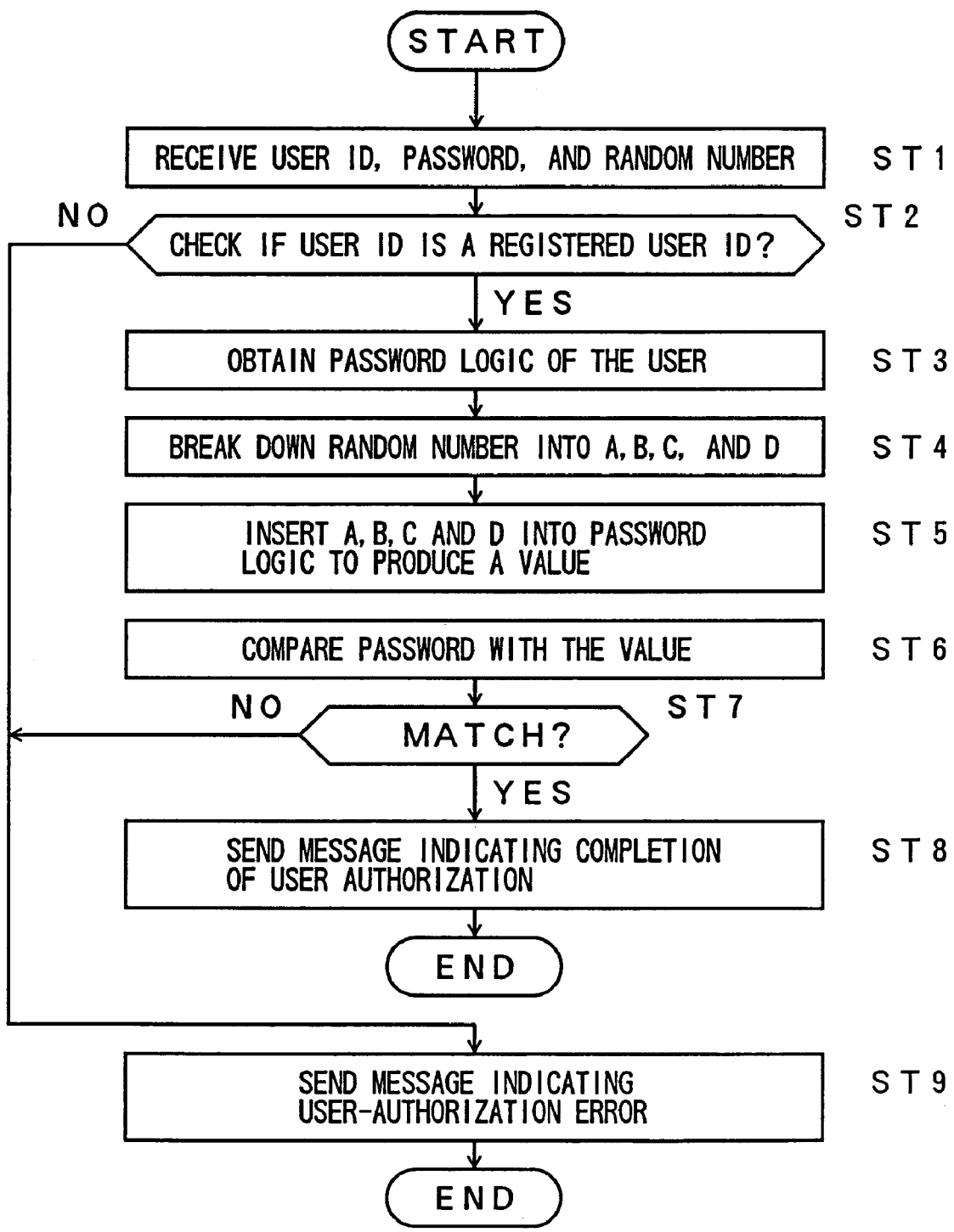
FIG. 16 is a flowchart of a process of checking user identification performed by the identification-check unit of FIG. 10.

FIG. 16 is a flowchart of a process of checking user identification performed by the identification-check unit 33.

At a step ST1, upon a request by the interaction unit 43 to check user identification, the identification-check unit 33 of the identification-check server 30 receives the random number, the user ID, and the password from the interaction unit 43.

At a step ST2, a check is made as to whether the received user ID is found as a registered user ID in the identification-check-data storage unit 31.

If the step ST2 finds that the user ID is a registered user ID, at a step ST3, a password logic corresponding to the user ID is obtained from the identification-check-data storage unit 31.

At a step ST4, the random number received at the step ST1 is broken down into four separate digits A, B, C, and D.

At a step ST5, the four digits are inserted into the password logic obtained at the step ST3 to produce a value corresponding to the password entered by the user.

In so doing, the identification-check unit 33 substitutes "0" for a result of a division operation if the division operation in the password logic has "0" as its denominator, and discards digits below a decimal point if a division operation in the password logic produces a remainder. Moreover, the identification-check unit 33 obtains an absolute value of a result of the password logic operation when the result of the password logic operation becomes negative, and outputs a pin code if the pin code is defined in place of a password logic.

At a step ST6, the password received at the step ST1 is compared with the value obtained at the step ST5.

At a step ST7, a check is made as to whether the comparison indicates a match. If there is a match, the procedure goes to a step ST8, where the identification-check unit 33 sends a message indicative of completion of user authorization to the interaction unit 43. This ends the procedure.

If the step ST2 finds that the received user ID is not registered in the identification-check-data storage unit 31, or if the step ST7 finds that the password does not match the obtained value, the procedure goes to a step ST9.

At the step ST9, the identification-check unit 33 sends a message indicating denial of user authorization to the interaction unit 43. This ends the procedure.

In the manner as described in conjunction with FIG. 15 and FIG. 16, when a user requests a check of user identification, the interaction unit 43 and the identification-check unit 33 interact with each other via the network 50. Through the interaction, a value is obtained from a random number and a password logic registered in the identification-check-data control unit 32, and is compared with a password that is entered by the user in response to the random number presented to the user. This achieves a proper user-identification check.

Use of such user-identification check insures high-level security even if someone surreptitiously picks up a number that the user enters. The user needs to remember only his/her password logic and nothing else. Likewise, the system needs to store only a password logic for each user. High-level security is thus achieved without imposing excessive burden on the user or on the system.

The password logic, which is equivalent to a personal identification code, is not transmitted through the network 50, except when the password logic is registered in the identification-check-data storage unit 31. This decreases a chance of someone picking up the password logic from the network 50, thereby achieving high-level security.

In the procedures of FIG. 15 and FIG. 16, the interaction unit 43 generates a random number. Alternatively, the identification-check unit 33 may generate a random number, and send it to the interaction unit 43.

As described above, the present invention registers a user-defined password logic, and generates a random number to be presented to a user. The user enters a password (value) in response to the presented random number. Then, the system generates a value from the random number and the user-defined password logic, and checks if the user-entered password matches the system-generated value, thereby checking a user identification.

According to this principle, the present invention may use a magnetic stripe card or an IC chard as a user-identification-check card, which record therein a user-defined password logic instead of a pin code.

A conventional user-identification-check card such as a magnet stripe card or an IC card records therein a user ID and a pin code. In contrast, the user-identification-check card according to the present invention records therein a user ID and a user-defined password logic.

Figure 17:
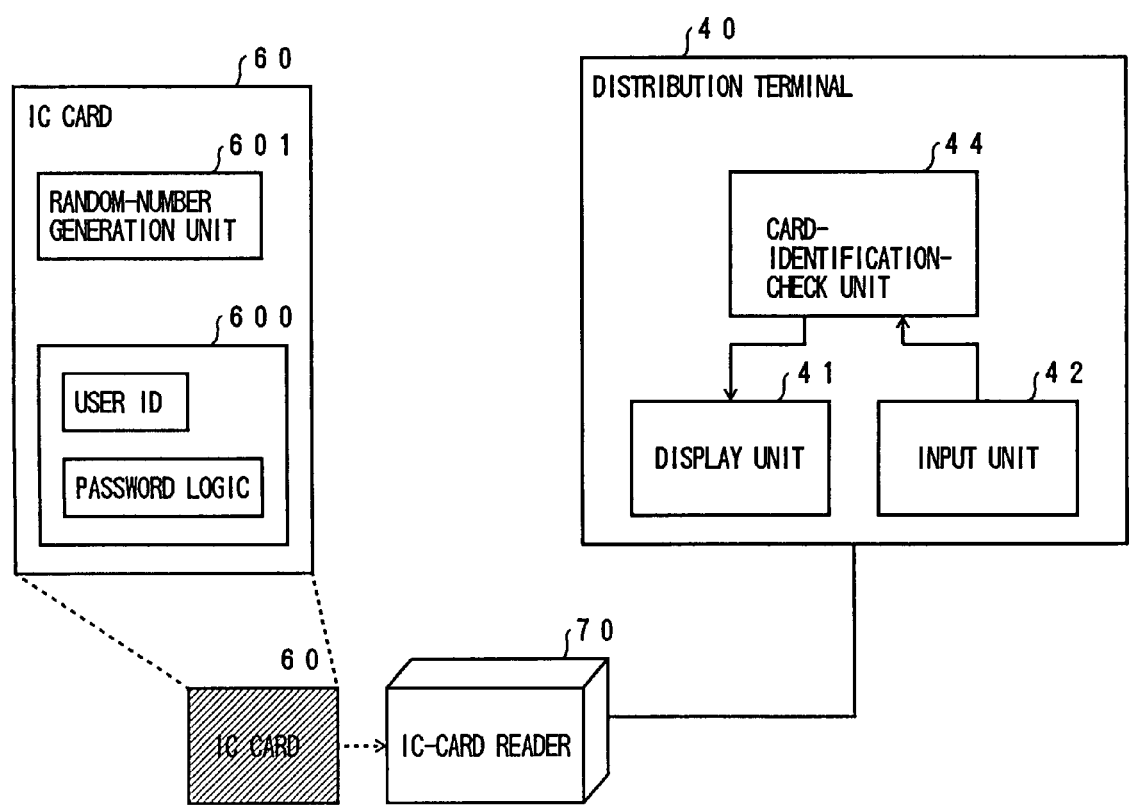
FIG. 17 is an illustrative drawing of a user-identificatin-check system utilizing a user-identification-check card according to the present invention.

FIG. 17 is an illustrative drawing of a user-identificatin-check system utilizing a user-identification-check card according to the present invention.

As shown in the figure, an IC card 60 of the present invention includes a memory unit 600 and a random-number generation unit 601. The memory unit 600 stores therein a user ID and a user-defined password logic.

The IC card 60 is inserted into an IC-card reader 70 connected to the distribution terminal 40. The distribution terminal 40 includes a card-identification-check unit 44 for performing a user-identification check by using the password logic recorded in the IC card 60.

Figure 18A:
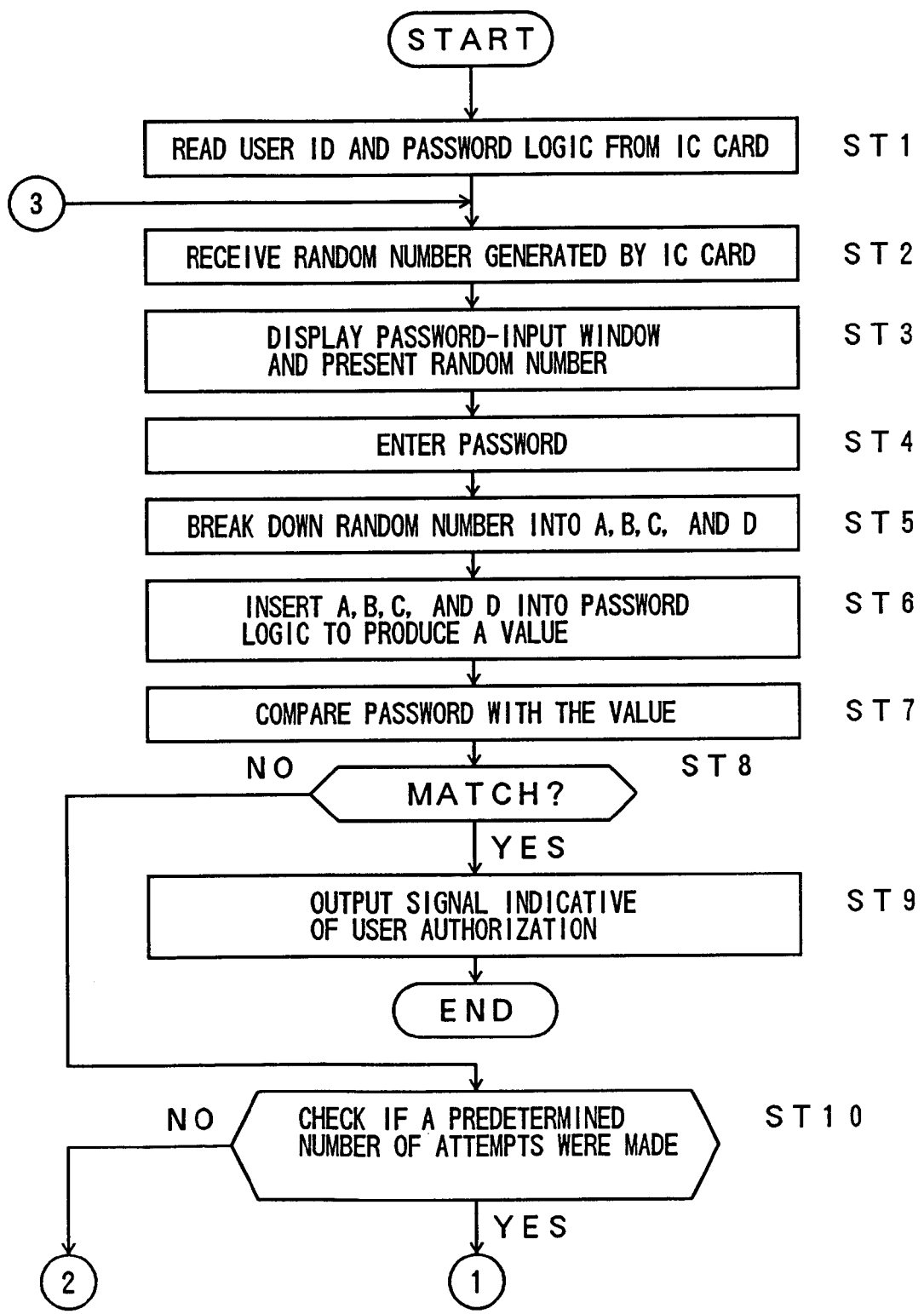
FIGS. 18A and 18B are a flowchart of a process performed by a card-identification-check unit of FIG. 17 when checking user identification by use of a card.
Figure 18B:
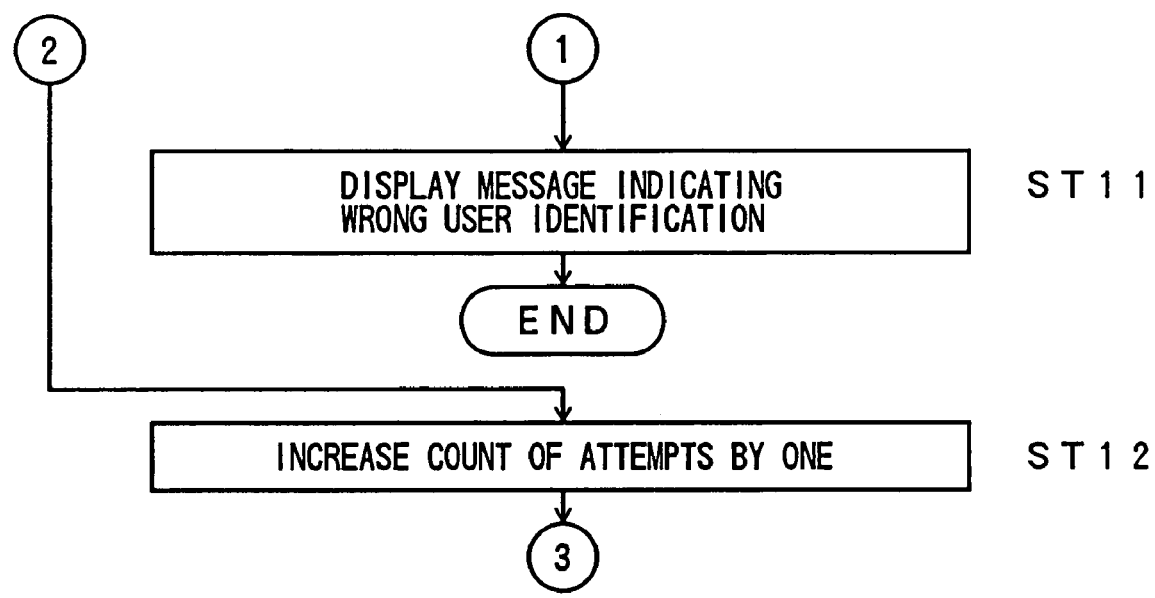

FIGS. 18A and 18B are a flowchart of a process performed by the card-identification-check unit 44 when checking user identification by use of a card. With reference to these figures, a check of user identification based on the IC card 60 will be described below.

At a step ST1, upon a request for user-identification check with respect to the IC card 60, the card-identification-check unit 44 of the distribution terminal 40 reads a user ID and a password logic from the IC card 60.

At a step ST2, the card-identification-check unit 44 receives a random number that is generated by the random-number generation unit 601 of the IC card 60.

At a step ST3, the card-identification-check unit 44 displays a password-input window as shown in FIG. 9, and presents the random number to the user. For example, a random number "4361" is generated and presented in the password-input window.

At a step ST4, the user enters a password in the password-input window.

The user calculates the password by applying the password logic recorded in the IC card 60 to the digits A, B, C, and D of the random number generated by the random-number generation unit 601. If a password logic has a division operation that has "0" as its denominator, the user obtains the password by substituting "0" for the result of the division operation. Further, if a password logic has a division operation that produces a remainder, the user obtains the password by discarding digits below a decimal point. Moreover, the user obtains the password by calculating an absolute value of a result of the password logic operation when the result of the password logic operation becomes negative. When the user has a pin code recorded in the IC card 60, the user enters the pin code as the password in the password-input window.

At a step ST5, the random number received at the step ST2 is broken down into four separate digits A, B, C, and D.

At a step ST6, the four digits are inserted into the password logic obtained at the step ST1 to produce a value corresponding to the password entered by the user.

At a step ST7, the password entered at the step ST4 is compared with the value obtained at the step ST6.

At a step ST9, a check is made as to whether the comparison indicates a match. If there is a match, the procedure goes to a step ST9, where the card-identification-check unit 44 outputs a signal (data) indicative of authorization of the user. In response, a program for business processing starts operation thereof. This ends the procedure.

If the step ST8 finds that the entered password does not match the obtained value, the procedure goes to a step ST10.

At the step ST10, a check is made as to whether the user-identification check has been attempted a predetermined number of times. If the predetermined number of attempts have been made, the procedure goes to a step ST11 of FIG. 18B, where the card-identification-check unit 44 displays a message indicating a wrong user identification on the display unit 41. This ends the procedure.

If the step ST10 finds that the user-identification check has not been attempted the predetermined number of times, the procedure goes to a step ST12, where a count of the number of attempts is increased by one. Then, the procedure goes back to the step ST1 to repeat the user-identification-check process as described above.

In this manner, the configuration described above utilizes a user-identification-check card such as a magnetic stripe card or an IC card which records therein a user-defined password logic. This configuration obtains a value from a random number and a user-defined password logic recorded in the user-identification-check card, and compares the obtained value with a password that is entered by the user in response to the random number presented to the user. This achieves a proper user-identification check.

Such a configuration insures high-level security since secrecy of password logic is maintained even when someone surreptitiously picks up a number that the user enters.

In the configuration of FIG. 17, the IC card 60 is equipped with the random-number generation unit 601. Alternatively, a mechanism for generating a random number may be provided in the card-identification-check unit 44.

In the embodiments described above, a password logic is applied to randomly generated digits. In addition to such digits, variables that can be uniquely determined by users or the system may be used as well. Such variables include date information, time information, etc.

For example, a variable ranging from 1 to 12 corresponding to respective months from January to December may be used, and/or a variable ranging from 0 to 24 corresponding to 0:00 hours to 24:00 hours may be employed. Such a variable may be incorporated in the password logic in addition to random digits. For example, a password logic may be represented as "(A−B)+n" where n represents the variable as described above.

As described hereinbefore, the prevent invention registers a user-defined password logic, and generates a random number to be presented to the user. The present invention then obtains a value from the random number and the user-defined password logic, and compares the obtained value with a value that is entered by the user in response to the random number presented to the user. This achieves a proper user-identification check. The present invention insures high-level security since secrecy of password logic is maintained even when someone surreptitiously picks up a number entered by the user.

Further, the present invention makes it possible to avoid transmission of a password logic over a network. In a network environment, therefore, the present invention offers a higher level of security than a conventional system, which transmits a pin code over the network.

The user needs to remember only his/her password logic and nothing else. Likewise, the system needs to store only a password logic for each user. High-level security is thus achieved without imposing excessive burden on the user or on the system.

Further, the present invention may utilize a card provided for a user for the purpose of owner identification, and this card records therein a user-defined password logic rather than a pin code. This configuration achieves higher level security than does a conventional system.

Further, the present invention is not limited to these embodiments, but various variations and modifications may be made without departing from the scope of the present invention.

The present application is based on Japanese priority application No. 11-113058 filed on Apr. 21, 1999, with the Japanese Patent Office, the entire contents of which are hereby incorporated by reference.

What is claimed is:

1. An apparatus for checking user identification, comprising:
    an arithmetic-formula storing unit configured to store user-defined arithmetic formulas associated with respective users, the arithmetic formulas defining calculation of variables that are assigned to respective digit positions arranged on a display screen;
    a display unit configured to display random digits at the respective digit positions arranged on the display screen when a user logs in; and
    a matching unit configured to retrieve from said arithmetic-formula storing unit one of the arithmetic formulas corresponding to a user identifier in response to the user input of the user identifier and an identification-purpose number, to calculate a value of said one of the arithmetic formulas by assigning the random digits to said one of the arithmetic formulas, to compare the value with the identification-purpose number, and to authenticate the user in response to a match therebetween.

2. The apparatus as claimed in claim 1, wherein said matching unit utilizes a predetermined number as said value in response to determination that said value is impossible to calculate based on the random digits and said one of the arithmetic formulas.

3. The apparatus as claimed in claim 1, wherein the variables include information about a date and time at which an identification process is performed.

4. An apparatus for checking user identification, comprising:
    a user-authentication card configured to store a user-defined arithmetic formula, the arithmetic formula defining calculation of variables that are assigned to respective digit positions arranged on a display screen;
    a display unit configured to display random digits at the respective digit positions arranged on the display screen when a user logs in; and
    a matching unit configured to calculate a value of the arithmetic formula by assigning the random digits to the arithmetic formula stored in said user-authentication card, to compare the value with an identification-purpose number entered by the user, and to authenticate the user in response to a match therebetween.

5. The device as claimed in claim 4, further comprising a registration/updating unit which updates one of the user-specific formulas in the control-data unit with a user-entered formula only if the user entering the user-entered formula proves knowledge of said one of the user-specific formulas by entering said one of the user-specific formulas.

6. The apparatus as claimed in claim 1, wherein when the user enters a wrong user-entered value, the user is allowed to enter a new user-entered value in response to at least one new randomly generated number being presented to the user.

7. A method of authenticating identity of a user to enable the user to gain access to a system, comprising:
    displaying a randomly generated number having digits displayed at respective positions to a user;
    generating a check value using a user-defined arithmetic formula of the user and the displayed randomly generated number including the respective positions of the digits displayed; and
    enabling access to the system when a value entered by the user responsive to the displayed randomly generated number matches the check number.

* * * * *